(12) United States Patent
Kittrell et al.

(10) Patent No.: US 7,727,504 B2
(45) Date of Patent: Jun. 1, 2010

(54) FIBERS COMPRISED OF EPITAXIALLY GROWN SINGLE-WALL CARBON NANOTUBES, AND A METHOD FOR ADDED CATALYST AND CONTINUOUS GROWTH AT THE TIP

(75) Inventors: W. Carter Kittrell, Houston, TX (US); Yuhuang Wang, Houston, TX (US); Myung Jong Kim, Houston, TX (US); Robert H. Hauge, Houston, TX (US); Richard E. Smalley, Houston, TX (US); Irene Morin Marek, legal representative, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1125 days.

(21) Appl. No.: 11/291,449

(22) Filed: Dec. 1, 2005

(65) Prior Publication Data

US 2007/0009421 A1    Jan. 11, 2007

Related U.S. Application Data

(60) Provisional application No. 60/632,205, filed on Dec. 1, 2004.

(51) Int. Cl.
*D01F 9/12* (2006.01)
*B82B 3/00* (2006.01)

(52) U.S. Cl. .................. 423/447.3; 427/249.4; 977/843; 977/848

(58) Field of Classification Search .............. 423/447.3; 427/249.4; 977/843, 848
See application file for complete search history.

(56) References Cited

U.S. PATENT DOCUMENTS 6,756,026 B2 * 6/2004 Colbert et al. ........... 423/447.3
6,841,139 B2 * 1/2005 Margrave et al. ......... 423/447.1

OTHER PUBLICATIONS

Murakami et al., Growth of vertically aligned single-walled carbon nanotube films on quartz substrates and their optical anisotropy, Chem. Phys Lett., 2004, 298-303, 385.
Huang et al., Patterned Growth and Contact Transfer of Well-Aligned Carbon Nanotube Films, J. Phys. Chem. B, 1999, 4223-4227,103.
Iijima, Helical microtubules of graphitic carbon, Nature, 1991, 56-58, 354.
Iijima et al., Single-shell carbon nanotubes of 1-nm diameter, Nature, 1993, 603-605, 363.
Bethune et al., Cobalt-catalysed growth of carbon nanotubes with single-automatic-layer walls, Nature, 1993, 605-607, 363.
Baughman et al., Carbon Nanotubes-the Route Toward Applications, Science, 2002, 787-792, 297.
Tans et al., Individual Single-wall Carbon Nanotubes as Quantum Wires, Nature, 1997, 474-477, 386.
Kong et al., Quantum Interference and Ballistic Transmission in Nanotube Electron Waveguides, Phys. Rev. Lett., 2001, 106801-1-106801-4, 87.
Liang et al., Fabry-Perot Interference in a Nanotube Electron Waveguide, Nature, 2001, 665-669, 411.
Tans et al., Room-temperature Transistor Based on a Single Carbon Nanotube, Nature, 1998, 49-52, 393.
Javey et al., Ballistic Carbon Nanotube Field-effect Transistors, Nature, 2003, 654-657, 424.
Durkop et al., Nanotubes are High Mobility Semiconductors, American Institute of Physics, 2002, 242-246, 633.
Saito et al., Physical Properties of Carbon Nanotubes, 1998, Imperial College Press, London.
Journet et al., Large-scale Production of Single-walled Carbon Nanotubes by the Electric-arc Technique, Nature, 1997, 756-758, 388.
Thess et al., Crystalline Ropes of Metallic Carbon Nanotubes, Science, 1996, 483-487, 273.
Zhang et al., Imaging as-grown Single-walled Carbon Nanotubes Originated from Isolated Catalytic Nanoparticles, Appl. Phys. A: Mater. Sci. & Proc., 2002, 325-328, 74.
Cheung et al., Diameter-Controlled Synthesis of Carbon Nanotubes, J. Phys. Chem. B, 2002, 2429-2433, 106.
Li et al., Growth of Single-Walled Carbon Nanotubes from Discrete Catalytic Nanoparticles of Various Sizes, J. Phys. Chem. B, 2001, 11424, 105.
Choi et al., Delivery of Catalytic Metal Species onto Surfaces with Dendrimer Carriers for the Synthesis of Carbon Nanotubes with Narrow Diameter Distribution, J. Phys. Chem. B, 2002, 12361-12365, 106.
An et al., Synthesis of Nearly Uniform Single-Walled Carbon Nanotubes Using Identical Metal-Containing Molecular Nanoclusters as Catalysts, J. Am. Chem. Soc., 2002, 13688-13689, 124.

(Continued)

*Primary Examiner*—Stuart Hendrickson
(74) *Attorney, Agent, or Firm*—Winstead PC

(57) ABSTRACT

The present invention is directed to fibers of epitaxially grown single-wall carbon nanotubes (SWNTs) and methods of making same. Such methods generally comprise the steps of: (a) providing a spun SWNT fiber; (b) cutting the fiber substantially perpendicular to the fiber axis to yield a cut fiber; (c) etching the cut fiber at its end with a plasma to yield an etched cut fiber; (d) depositing metal catalyst on the etched cut fiber end to form a continuous SWNT fiber precursor; and (e) introducing feedstock gases under SWNT growth conditions to grow the continuous SWNT fiber precursor into a continuous SWNT fiber.

27 Claims, 14 Drawing Sheets

OTHER PUBLICATIONS

Liu et al., Recent Advances in Methods of Forming Carbon Nanotubes, MRS Bulletin, 2004, 244-250, 29.

Murakami et al., Growth of Vertically Aligned Single-walled Carbon Nanotube Films on Quartz Substrates and their Optical Anisotropy, Chem. Phys. Lett., 2004, 298-303, 385.

Davis et al., Phase Behavior and Rheology of SWNTs in Superacids, Macromolecules, 2004, 154-160, 37.

Zhou et al., Single Wall Carbon Nanotube Fibers Extruded from Super-acid Suspensions: Preferred Orientation, Electrical, and Thermal Transport, J. Appl. Phys., 2004, 649-655, 95.

Zhou et al., Preferred Orientation in Fibers of HiPco Single Wall Carbon Nanotubes from Diffuse X-ray Scattering, Mater. Res. Soc. Symp. Proc., 2002, 429-434, 740.

Ericson et al., Macroscopic Neat Single-Wall Carbon Nanotube Fibers. Thesis, Rice University, Houston, TX, 2003.

Ramesh et al., Dissolution of Pristine Single Walled Carbon Nanotubes in Superacids by Direct Protonation, J. Phys. Chem. B, 2004, 8794-8798, 108.

Wang et al., Revealing the Substructure of Single-Walled Carbon Nanotube Fibers, Chem. Mater., (pre-publication manuscript).

Weisman et al., Depen. of Optical Transition Energies on Structure for Single-Walled Carbon Nanotubes in Aqueous Suspension: An Empirical Kataura Plot, Nano Lett., 2003, 1235-1238, 3.

Wang et al., Continued Growth of Single-Walled Carbon Nanotubes, Nano Lett., 2005, 997-1002, 5.

Chen et al., Bulk Separative Enrichment in Metallic or Semiconducting Single-Walled Carbon Nanotubes, Nano Lett., 2003, 1245-1249, 3.

Zheng et al., DNA-Assisted Dispersion and Separation of Carbon Nanotubes, Nature Materials, 2003, 338-342, 2.

Krupke et al., Separation of Metallic from Semiconducting Single-Walled Carbon Nanotubes, Science, 2003, 344-347, 301.

Strano et al., Electronic Structure Control of Single-Walled Carbon Nanotube Functionalization, Science, 2003, 1519-1522, 301.

Chattopadhyay et al., A Route for Bulk Separation of Semiconducting from Metallic Single-Wall Carbon Nanotubes, J. Am. Chem. Soc., 2003, 3370-3375, 125.

Ericson et al., Macroscopic, Neat, Single-Walled Carbon Nanotube Fibers, Science, 2004, 1447-1450, 305.

Wang, Y. H., Seed Crystals and Catalyzed Epitaxy of Single-Walled Carbon Nanotubes, Thesis, Rice University, 2004.

Kuznetsova et al., Enhancement of Adsorption Inside of Single-walled Nanotubes: Opening the Entry Ports, Chem. Phys. Lett., 2000, 292-296, 321.

Byl et al., Adsorption of $CF_4$ on the Internal and External Surfaces of Opened Single-Walled Carbon Nanotubes: A Vibrational Spectroscopy Study, J. Am. Chem. Soc., 2003, 5889-5896, 125.

Zhang et al., Metal Coating on Suspended Carbon Nanotubes and its Implication to Metal-Tube Interaction, Chem. Phys. Lett., 2000, 35-41, 331.

Bronikowski et al., Gas-Phase Production of Carbon Single-Walled Nanotubes from Carbon Monoxide via the HiPco Process: A Parametric Study, J. Vac. Sci. Technol. A, 2001, 1800-1805, 19-4.

Kataura et al., Optical Properties of Single-Wall Carbon Nanotubes, Synthetic Metals, 1999, 2555-2558, 103.

Duesberg et al., Polarized Raman Spectroscopy on Isolated Single-Wall Carbon Nanotubes, Phys. Rev. Lett., 2000, 5436-5439, 85.

Qian et al., Quantitative Raman Characterization of the Mixed Samples of the Single and Multi-Wall Carbon Nanotubes, Carbon, 2003, 1851-1864, 41.

Murakami et al., Direct Synthesis of High-Quality Single-Walled Carbon Nanotubes on Silicon and Quartz Substrates, Chem. Phys. Lett., 2003, 49-54, 377.

Heller et al., Using Raman Spectroscopy to Elucidate the Aggregation State of Single-Walled Carbon Nanotubes, J. Phys. Chem. B, 2004, 6905-6909, 108.

Louchev et al., Growth Mechanism of Carbon Nanotube Forests by Chemical Vapor Deposition, Appl. Phys. Lett., 2002, 2752-2754, 80.

Chisholm et al., Comment on "Single Crystals of Single-Walled Carbon Nanotubes Formed by Self-Assembly," Science, 2003, 1236b, 300.

Ajayan et al., Aligned Carbon Nanotube Arrays Formed by Cutting a Polymer Resin-Nanotube Composite, Science, 1994, 1212-1214, 265.

\* cited by examiner

FIBERS COMPRISED OF EPITAXIALLY GROWN SINGLE-WALL CARBON NANOTUBES, AND A METHOD FOR ADDED CATALYST AND CONTINUOUS GROWTH AT THE TIP

CROSS-REFERENCE TO RELATED APPLICATIONS

This application for patent claims priority to U.S. Provisional Patent Application Ser. No. 60/632,205, filed Dec. 1, 2004.

FEDERALLY-SPONSORED RESEARCH

This invention was made, in part, with support from the Dept. of Energy, Grant No. DE-AC05-00OR22725.

FIELD OF THE INVENTION

This invention relates generally to carbon nanotubes, and specifically to methods for permitting continuous growth of single-wall carbon nanotubes.

BACKGROUND

Carbon nanotubes (CNTs), comprising multiple concentric shells and termed multi-wall carbon nanotubes (MWNTs), were discovered by Iijima in 1991 [Iijima, *Nature* 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., *Nature* 1993, 363, 603-605; and Bethune et al., *Nature* 1993, 363, 605-607]. These carbon nanotubes (especially SWNTs) possess unique mechanical, electrical, thermal and optical properties, and such properties make them attractive for a wide variety of applications. See Baughman et al., *Science,* 2002, 297, 787-792.

Whether a pristine SWNT conducts electrons as a quantum wire [Tans et al., *Nature* 1997, 386, 474; Kong et al., *Phys. Rev. Lett.* 2001, 87, 106801; Liang et al., *Nature* 2001, 411, 665] or behaves as an exceptional semiconductor [Tans et al., *Nature* 1998, 393, 49; Javey et al., *Nature* 2003, 424, 654; Durkop et al., *AIP Conference Proceedings* 2002, 633, 242] is determined by its diameter and chiral angle, uniquely indexed with two integers (n,m) [Saito, R.; Dresselhaus, G.; Dresselhaus, M. S. *Physical Properties of Carbon Nanotubes*; Imperial College Press: London, 1998]. The wide variety of achievable diameters and chiral angles, and their associated properties, make it possible to select tubes of exactly the right kind for optimized performance; however, controlling their (n,m) structure during manufacturing is currently a grand challenge. Although SWNTs are produced with a variety of methods such as arc discharge [Bethune et al., *Nature* 1993, 363, 605; Journet et al., *Nature* 1997, 388, 756], laser ablation [Thess et al., *Science* 1996, 273, 483], and chemical vapor deposition (CVD) [Zhang et al., *Appl. Phys. A: Mater. Sci. & Proc.* 2002, 74, 325; Cheung et al., *J. Phys. Chem. B* 2002, 106, 2429; Li et al., *J. Phys. Chem. B* 2001, 105, 11424; Choi et al., *J. Phys. Chem. B* 2002, 106, 12361; An et al., *J. Am. Chem. Soc.* 2002, 124, 13688; Liu et al., *MRS Bulletin* 2004, 29, 244; Murakami et al., *Chem. Phys. Lett.* 2004, 385, 298], none is capable of precisely controlling both the tube diameter and chirality [Liu et al., *MRS Bulletin* 2004, 29, 244]. In the case of CVD, the most frequently studied method of growth, SWNT diameters are often found to correlate strongly with the diameter of the metal particles from which they are nucleated [Zhang et al., *Appl. Phys. A: Mater. Sci. & Proc.* 2002, 74, 325; Cheung et al., *J. Phys. Chem. B* 2002, 106, 2429; Li et al., *J. Phys. Chem. B* 2001, 105, 11424; Choi et al., *J. Phys. Chem. B* 2002, 106, 12361; An et al., *J. Am. Chem. Soc.* 2002, 124, 13688]. However, even starting with metal clusters of identical structure, the growths show no specific control over the chiral angles [An et al., *J. Am. Chem. Soc.* 2002, 124, 13688].

As a result of the foregoing, a method for the continuous growth of SWNTs from existing SWNTs and/or SWNT seeds would be extremely useful, particularly wherein such methods permit growth of SWNTs with diameter and/or chirality that is identical to the SWNT seeds.

BRIEF DESCRIPTION OF THE INVENTION

In some embodiments, the present invention is directed to methods providing for the continued growth of single-wall carbon nanotubes (SWNTs) from ordered arrays of open-ended SWNTs ("seeds") in a manner analogous to epitaxy. Typically, such ordered arrays are SWNT fibers that have been cut substantially perpendicular to the fiber axis. In some such embodiments, nanometer-sized metal catalysts are docked to the SWNT open ends and subsequently activated to restart growth. SWNTs thus grown inherit their diameters and chirality from the seeded SWNTs, as indicated by the closely matched frequencies of Raman radial breathing modes before and after the growth.

In some embodiments, the present invention is directed to methods comprising the steps of: (a) providing a spun SWNT fiber; (b) cutting the fiber substantially perpendicular to the fiber axis to yield a cut fiber; (c) etching the cut fiber at its end with a plasma to yield an etched cut fiber; (d) depositing metal catalyst on the etched cut fiber end to form a continuous SWNT fiber precursor; and (e) introducing feedstock gases under SWNT growth conditions to grow the continuous SWNT fiber precursor into a continuous SWNT fiber. To the extent that such methods produce novel compositions, the present invention is also directed to such novel compositions and applications thereof.

In some such above-described method embodiments, the SWNT fiber is spun from a superacid suspension of SWNTs. In some such embodiments, the superacid is oleum.

In some such above-described method embodiments the step of cutting comprises the substeps of: (a) mounting the fiber in a matrix material to form an immobilized fiber; (b) using a cutting means to cut the fiber and matrix material of the immobilized fiber substantially perpendicular to the fiber axis; and (c) dissolving away the matrix material to yield a cut fiber. In some such embodiments, the matrix material comprises a polysaccharide. In some such embodiments, the cutting means is a microtome. In some such embodiments, the cutting involves the use of an ion beam.

In some such above-described method embodiments, in the step of etching the plasma comprises a gas selected from the group consisting of oxygen, argon, and combinations thereof. In some such embodiments, the etching removes any SWNT portions in the fiber that were bent as a result of the cutting.

In some such above-described method embodiments, in the step of depositing, the metal catalyst is deposited via e-beam metal evaporation. In some or other embodiments, the metal catalyst comprises metal selected from the group consisting of Fe, Ni, and combinations thereof.

In some such above-described method embodiments, in the step of introducing, the growth conditions comprise heating the fiber with a laser. In some embodiments, the feedstock gas generally comprises a carbon-containing species such as, but not limited to, ethanol, acetylene, methane, and the like. In some such embodiments, the feedstock gas further comprises at least one gas selected from the group consisting of hydrogen, water, inert species, and combinations thereof.

In some such above-described method embodiments, there further comprises a step of monitoring the fiber growth in situ. In some such embodiments, the in situ monitoring is accomplished with a CCD camera.

While the discussion herein primarily involves SWNTs, those of skill in the art will appreciate that the methods of the present invention can be extended to generally include other carbon nanotubes (CNTs), such that the CNTs can be spun into a fiber and further grown with a feedstock gas under growth conditions. Other such suitable CNTs include, but are not limited to, multi-wall carbon nanotubes (MWNTs), double-wall carbon nanotubes, small diameter (<3 nm) carbon nanotubes, and combinations thereof.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

(F) A glowing SWNT fiber with temperature determined from integrated blackbody radiation.

DETAILED DESCRIPTION OF THE INVENTION

In some embodiments, the present invention is directed to methods providing for the continued growth of single-wall carbon nanotubes (SWNTs) from ordered arrays of open-ended SWNTs ("seeds") in a manner analogous to epitaxy. Typically, such ordered arrays are SWNT fibers that have been cut substantially perpendicular to the fiber axis. In some such embodiments, nanometer-sized metal catalysts are docked to the SWNT open ends and subsequently activated to restart growth. SWNTs thus grown inherit their diameters and chirality from the seeded SWNTs, as indicated by the closely matched frequencies of Raman radial breathing modes before and after the growth.

Figure 1:
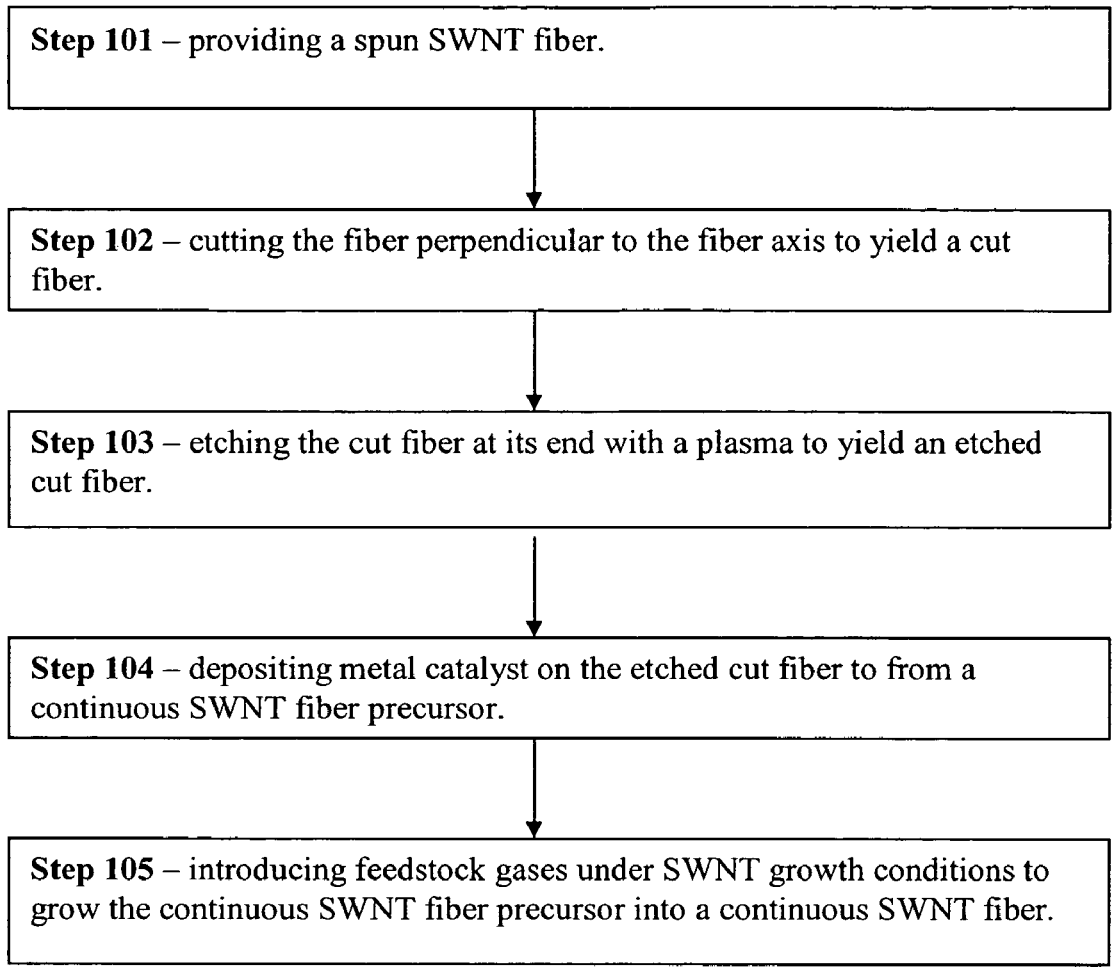
FIG. 1 schematically illustrates steps in the continuous growth of SWNTs, in accordance with embodiments of the present invention.

Referring to FIG. 1, in some embodiments, the present invention is directed to methods comprising the steps of: (Step 101) providing a spun SWNT fiber; (Step 102) cutting the fiber substantially perpendicular to the fiber axis to yield a cut fiber; (Step 103) etching the cut fiber at its end with a plasma to yield an etched cut fiber; (Step 104) depositing metal catalyst on the etched cut fiber end to form a continuous SWNT fiber precursor; and (Step 105) introducing feedstock gases under SWNT growth conditions to grow the continuous SWNT fiber precursor into a continuous SWNT fiber. To the extent that such methods produce novel compositions, the present invention is also directed to such novel compositions and applications thereof.

In some such above-described method embodiments, the SWNT fiber is spun from a superacid suspension of SWNTs. In some such embodiments, the superacid is oleum. Generally, however, the SWNT fiber can be any SWNT fiber comprising SWNTs oriented substantially parallel to the fiber axis and which can be suitably cut, in accordance with embodiments of the present invention.

In some such above-described method embodiments the step of cutting comprises the substeps of: (a) mounting the fiber in a matrix material to form an immobilized fiber; (b) using a cutting means to cut the fiber and matrix material of the immobilized fiber substantially perpendicular to the fiber axis; and (c) dissolving away the matrix material to yield a cut fiber. In some such embodiments, the matrix material comprises a polysaccharide. In some such embodiments, the cutting means is a microtome. In some or other embodiments, the cutting involves the use of an ion beam.

In some such above-described method embodiments, in the step of etching the plasma comprises a gas selected from the group consisting of oxygen, argon, and combinations thereof. In some such embodiments, the etching removes any SWNT portions in the fiber that were bent as a result of the cutting.

In some such above-described method embodiments, in the step of depositing, the metal catalyst is deposited via e-beam metal evaporation. In some or other embodiments, the metal catalyst comprises metal selected from the group consisting of Fe, Ni, and combinations thereof.

In some such above-described method embodiments, in the step of introducing, the growth conditions comprise heating the fiber with a laser. In some embodiments, the feedstock gas(es) generally comprises a carbon-containing species such as, but not limited to, ethanol, acetylene, methane, and the like. In some such embodiments, the feedstock gas further comprises at least one gas selected from the group consisting of hydrogen, water, inert species, and combinations thereof.

In some such above-described method embodiments, there further comprises a step of monitoring the fiber growth in situ. In some such embodiments, the in situ monitoring is accomplished with a CCD camera and/or other spectroscopic means.

"Continuous growth," as defined herein, is an epitaxial fiber growth method whereby a bundle of aligned single-wall carbon nanotubes (seed fiber) is elongated by addition of catalyst and carbon-containing "growth gas". The catalyst is deposited onto the tips of the nanotubes on the seed fiber. The fiber is heated to activate the catalyst, and carbon containing feedstock (growth gas) is introduced. For such feedstock, ethanol is a suitable and exemplary source of carbon, and other gases, such as hydrogen, can be used to regulate the carbon activity and also to clean up unwanted amorphous carbon that may also form. The feedstock vapors decompose on the catalyst particles and add carbon to the ends of the individual nanotubes, thereby extending their length. As each nanotube increases in length, the chirality of each is maintained. The catalyst particles remain at the tips of the nanotubes and will hence "lift off" from the original surface or plane of the cut seed fiber. By remaining at the tip, the catalyst is always exposed to the carbon-containing feedstock gas, and can continue to lengthen the nanotube indefinitely. In contrast to the "supported catalyst" methods of the prior art in which the overgrowth of the carbon nanotubes restricts access of the feedstock and inhibits growth, the present invention utilizes exposed catalyst at the tips of the fibers that allows for the continual addition of more catalyst. Since the chirality of the growing fiber is determined by the seed fiber, the composition of the grown fiber may be determined by the seed. In particular, a seed of all one chirality will lead to a grown fiber of exclusively the same chirality.

Fiber Spinning

In some embodiments, the continuous, neat SWNT fibers are spun from a concentrated dispersion of SWNTs in $H_2SO_4$ via an industrially viable wet-jet solution-spinning approach. The details of this process have been described elsewhere [Davis et al., *Macromolecules* 2004, 37, 154-160; Zhou et al., *J. Appl. Phys.* 2004, 95, 649-655; Zhou et al., Mater. Res. Soc. Symp. Proc. 2002, 740, 429-434; Ericson et al., Macroscopic Neat Single-Wall Carbon Nanotube Fibers. Thesis, Rice University, Houston, Tex., 2003; Ramesh et al., *J. Phys. Chem. B* 2004, 108, 8794-8798]. Briefly, 4-10 wt % purified HiPco-produced SWNTs (Carbon Nanotechnologies, Inc.) were mixed with 102% sulfuric acid (2 wt % excess $SO_3$) to form a liquid crystalline dispersion [Davis et al., *Macromolecules* 2004, 37, 154-160]. This ordered SWNT dispersion was then extruded through a small orifice into a coagulant without any extensional drawing.

Microtome Cutting

Figure 2:
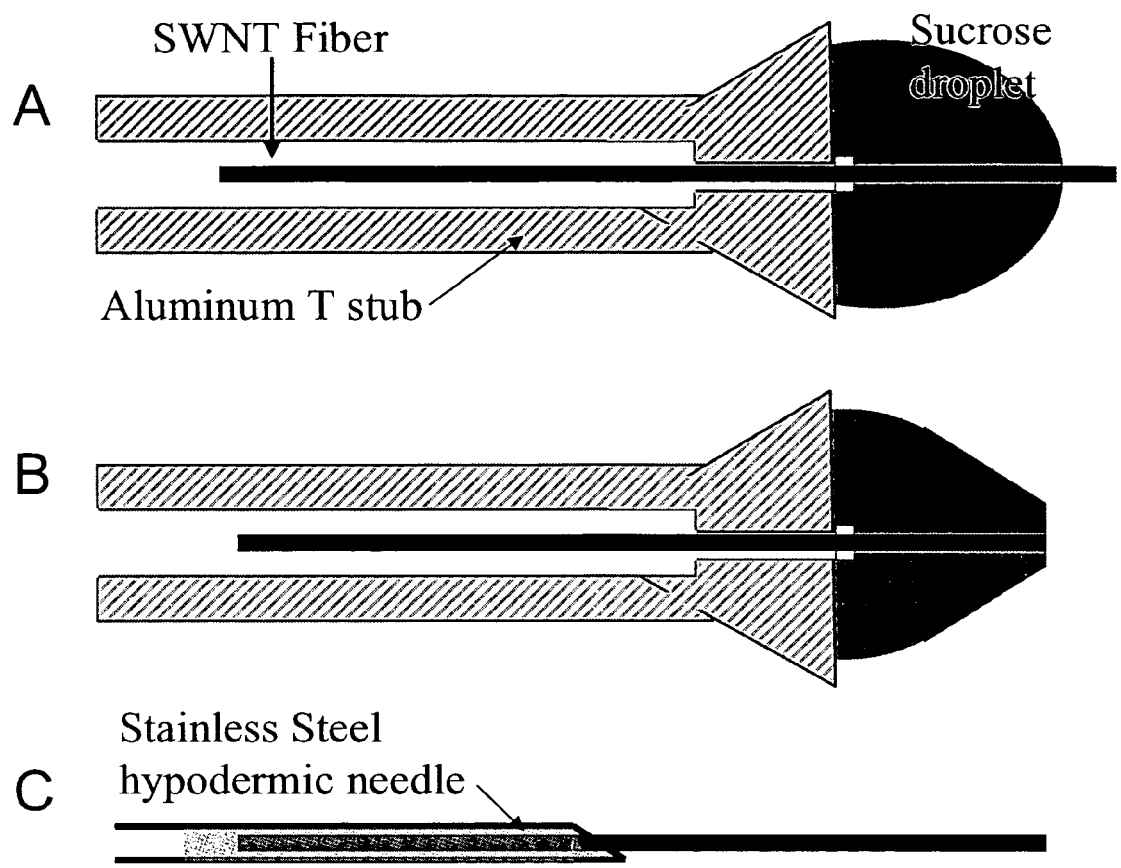
FIG. 2 schematically illustrates fiber microtoming, wherein (A) depicts a drop of 2.3 M sucrose solution on a T-shaped aluminum stub through which a SWNT fiber has been inserted and frozen to −100° C.; (B) depicts a trimmed tip of the frozen sucrose droplet that is centered by the SWNT fiber that has been microtomed; and (C) depicts a recovered microtomed SWNT fiber that has been mounted onto a stainless steel hypodermic needle, with the microtomed end protruding ca. 2-3 mm from the needle tip.
Figure 3:
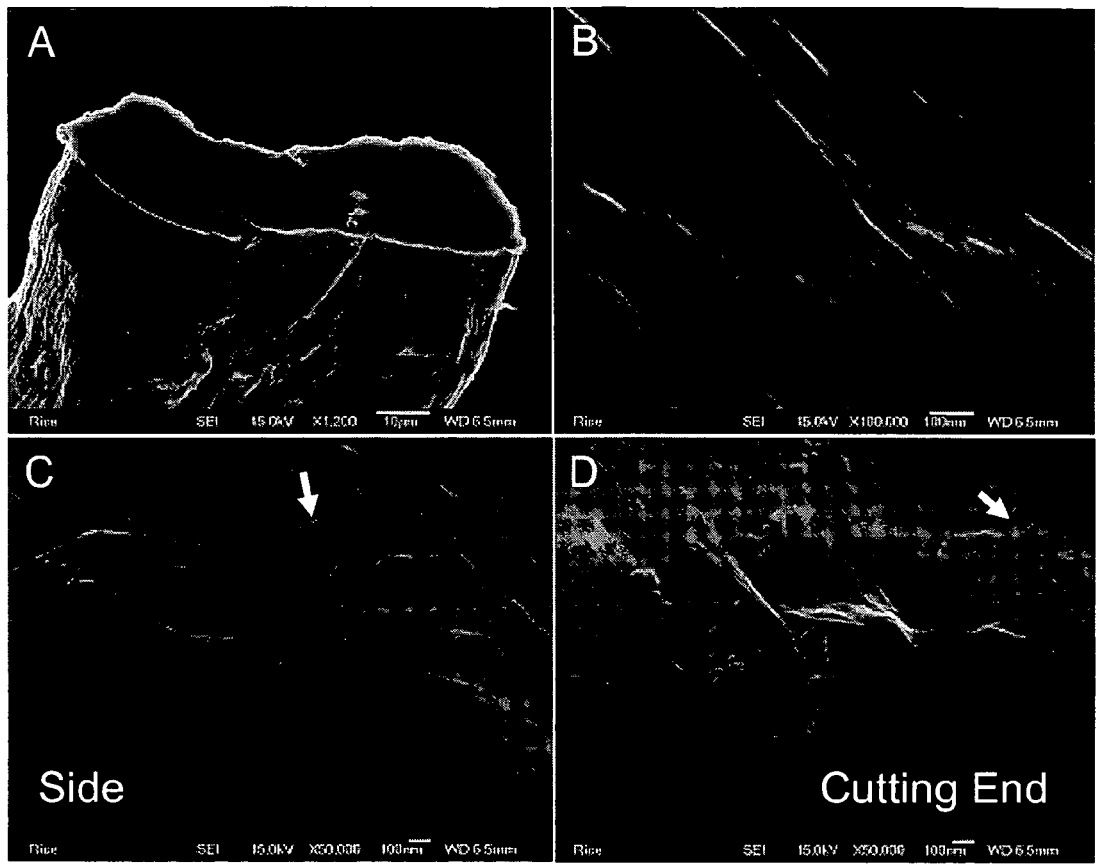
FIGS. 3A-3D are SEM images of a microtomed fiber, wherein (A) is a dog-boned cross section with voids revealed; (B) is SWNTs aligned along the microtoming direction to form a combed layer as thin as the diameter of a rope, as observed at the side (C), and the end of the combed layer (D).

In some embodiments, cutting of the SWNT fiber is done via microtome cutting. Referring to FIG. 2, in some such embodiments, the spun fiber is mounted in a polysaccharide material, and immobilized in it to form an assembly (2A). This assembly is then installed in a microtome cutting device which is operated at reduce temperature to harden the polysaccharide matrix. A diamond knife is then used to cut the matrix and the fiber (2B). The cut is made substantially perpendicular to the end of the fiber and several thin cuts are made to assure a smooth cut. The polysaccharide is then dissolved with water, and the cut fiber is glued into a hypodermic needle with silver paint (2C).

The above-described microtome cutting process results in an overlayer of nanotubes about 50 nm thick "lying down" on the surface. This overlayer of nanotubes leaves them perpendicular to the nanotubes beneath, and perpendicular to the fiber axis. This is termed a "combed layer," as the planar array of nanotubes is mostly aligned in the direction of cutting by the microtome. Typically, this layer must be removed for continued growth to take place on the underlying vertical nanotubes, which are parallel to the axis of the spun fiber. Leftover catalyst from the spun fiber and amorphous carbon needs to also be cleaned off before growth can take place.

To further illustrate a microtomed SWNT fiber surface, in accordance with some embodiments of the present invention, FIGS. 3A-3D are scanning electron microscopy (SEM) images of a microtomed fiber, wherein (3A) is a dog-boned cross section with voids revealed; (3B) is SWNTs aligned along the microtoming direction to form a combed layer as thin as the diameter of a rope, as observed at the side (3C), and the end of the combed layer (3D). Additional details regarding the microtome cutting can be found in Wang et al., "Revealing the Substructure of Single-Walled Carbon Nanotube Fibers," *Chem. Mater.* (in press), DOI: 10.1021/cm0518473.

Plasma Etching

In some embodiments, the mounted cut fiber is placed into a plasma etcher that uses a radio-frequency (RF) inductive discharge in a 4:1 mixture of argon:oxygen at a pressure of 50 mTorr to create an etching medium. In some such embodiments, a metallic cylindrical shield, 20 mm ID, is placed around the fiber and protrudes ca. 7 mm past the end of the fiber. This minimizes electric currents from flowing in the fiber, which in turn can cause undesirable, irregular etching and development of fissures. Use of a Mu-metal shield also reduces magnetic fields. Having the open end of the shield exposed to the plasma allows reactive singlet oxygen to eat away the combed layer and expose metal catalyst particles. After ca. 20 minutes, the overlayer is etched away. This plasma etched fiber is soaked in 1N HCl and rinsed with alcohol to remove catalyst and carbon debris. SEM images are taken to determine the condition of the surface of the tip of the cleaned fiber. This also serves as a reference for subsequent cleaning and growth processes. The fiber is then placed into the growth chamber.

Figure 4:
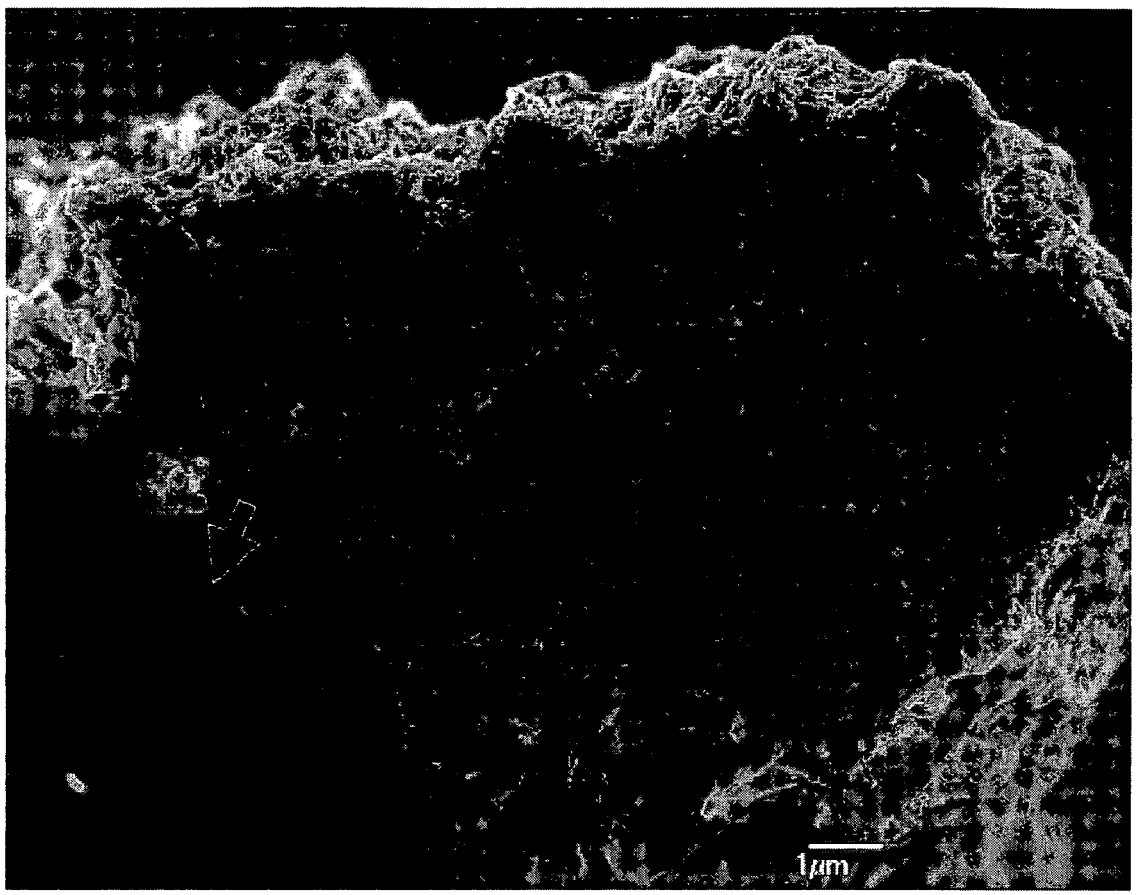
FIG. 4 is an SEM image of a macroscopic array of SWNTs from a 6% SWNT fiber. The arrow points to the residual combed layer. The fiber was microtomed by a glass knife, partially etched with a O supersonic jet, cleaned with 1N hydrochloric acid, heated in 0.28 Torr $H_2$ up to 840° C. for 30 minutes, and then cleaned again with 1N hydrochloric acid.

To further illustrate such SEM examination, FIG. 4 is an SEM image of a macroscopic array of SWNTs from a 6% SWNT fiber. The arrow points to the residual combed layer. The depicted fiber was microtomed by a glass knife, partially etched with a O supersonic jet, cleaned with 1N hydrochloric acid, heated in 0.28 Torr $H_2$ up to 840° C. for 30 minutes, and then cleaned again with 1N hydrochloric acid.

Figure 5:
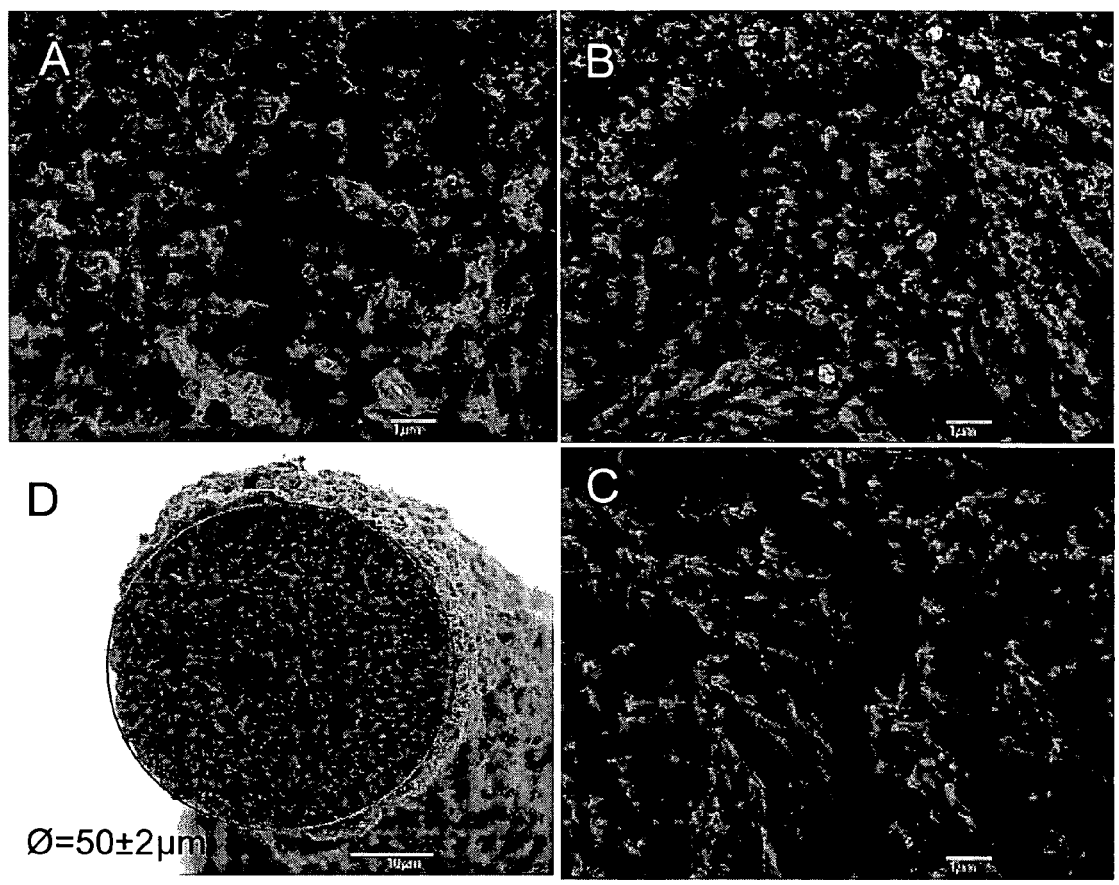
FIGS. 5A-5D illustrate, via SEM, an exemplary preparation of a macroscopic array of open-ended SWNTs. The fiber was spun from a 10 wt % SWNTs/$H_2SO_4$ dispersion with an iron content of 0.6-1.0 atomic %. (A) The combed layer was etched by an inductively coupled oxygen RF plasma, leaving loose, cloudy residuals. (B) The loose residuals were removed by 1N hydrochloric acid solution at room temperature. (C) After heating with $H_2$, surface oxides were removed. (D) Low magnification image showing the cleaned cross section of the SWNT fiber.

FIGS. 5A-5D illustrate, via SEM, an exemplary preparation of a macroscopic array (i.e., cut fiber) of open-ended SWNTs, in accordance with some embodiments of the present invention. The depicted fiber was spun from a 10 wt % SWNTs/$H_2SO_4$ dispersion with an iron content of 0.6-1.0 atomic %. FIG. 5A illustrates a combed layer, after been etched by an inductively coupled oxygen RF plasma, leaving loose, cloudy residuals. FIG. 5B illustrates the fiber after loose residuals were removed by 1N hydrochloric acid solution at room temperature. FIG. 5C illustrates the fiber after heating with $H_2$, such that surface oxides were removed. FIG. 5D is a low-magnification image showing the cleaned cross section of the SWNT fiber.

Figure 6:
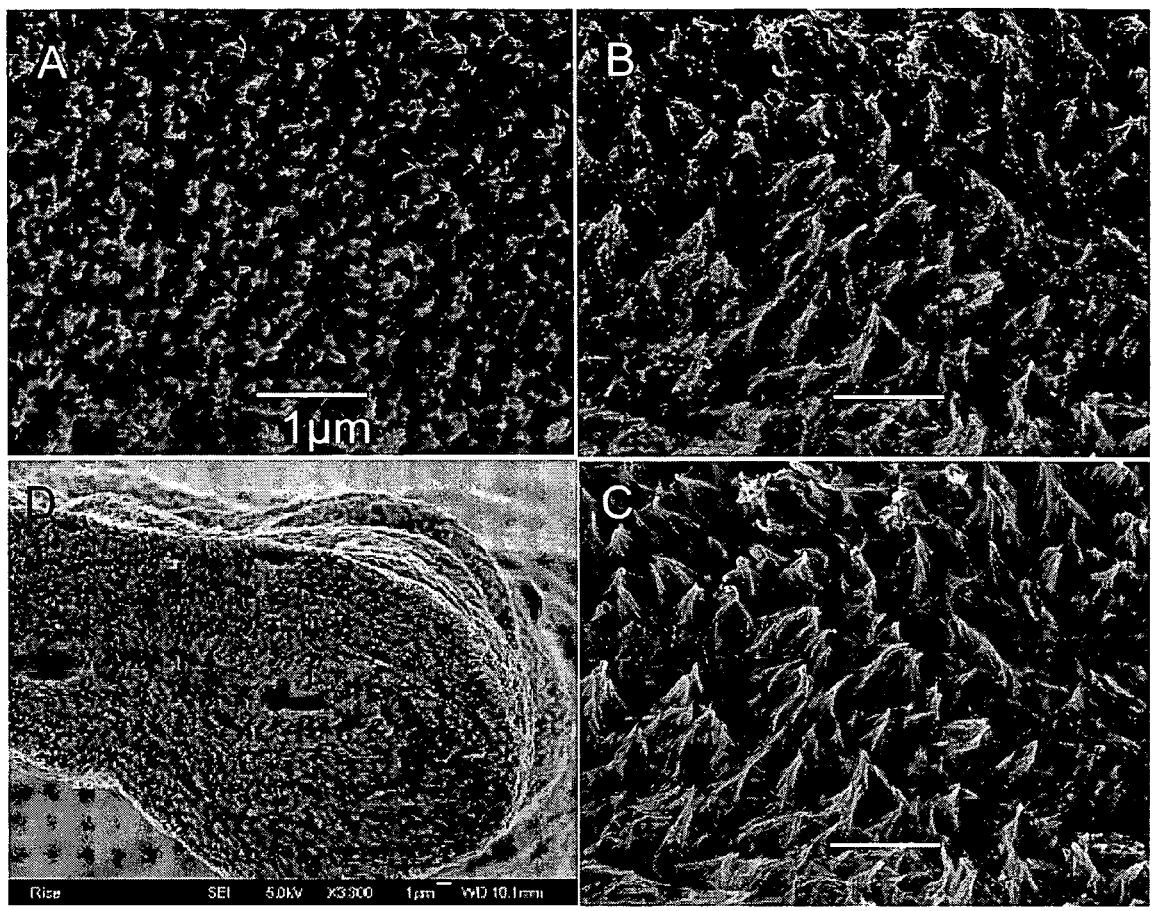
FIGS. 6A-6D illustrates, via SEM, an exemplary preparation of a macroscopic array of open-ended SWNTs. The fiber was spun from a 8 wt % SWNTs/$H_2SO_4$ dispersion with a residual iron content of 0.8 atomic %. (A) The combed layer was etched by an inductively coupled oxygen RF plasma without shielding, and cleaned with hydrochloric acid. (B) The surface was cleaned by heating in $H_2$ at 735° C. for 30 minutes. After $H_2$ cleaning, surface oxides were removed and residual metals migrated to the surface. (C) The metal was removable with 1N hydrochloric acid. (D) Low magnification image showing the cleaned cross section of the SWNT fiber.

FIGS. 6A-6D illustrates, via SEM, an exemplary preparation of a macroscopic array of open-ended SWNTs, in accordance with some embodiments of the present invention. The shown fiber was spun from a 8 wt % SWNTs/$H_2SO_4$ dispersion with a residual iron content of 0.8 atomic %. FIG. 6A depicts the combed layer after being etched by an inductively coupled oxygen RF plasma without shielding, and cleaned with hydrochloric acid. FIG. 6B depicts the fiber surface after heating in $H_2$ at 735° C. for 30 minutes. After $H_2$ cleaning, surface oxides were removed and residual metals migrated to the surface. FIG. 6C depicts the fiber surface after metal was removable with 1N hydrochloric acid. FIG. 6D is a low-magnification image showing the cleaned cross section of the SWNT fiber.

Figure 7:
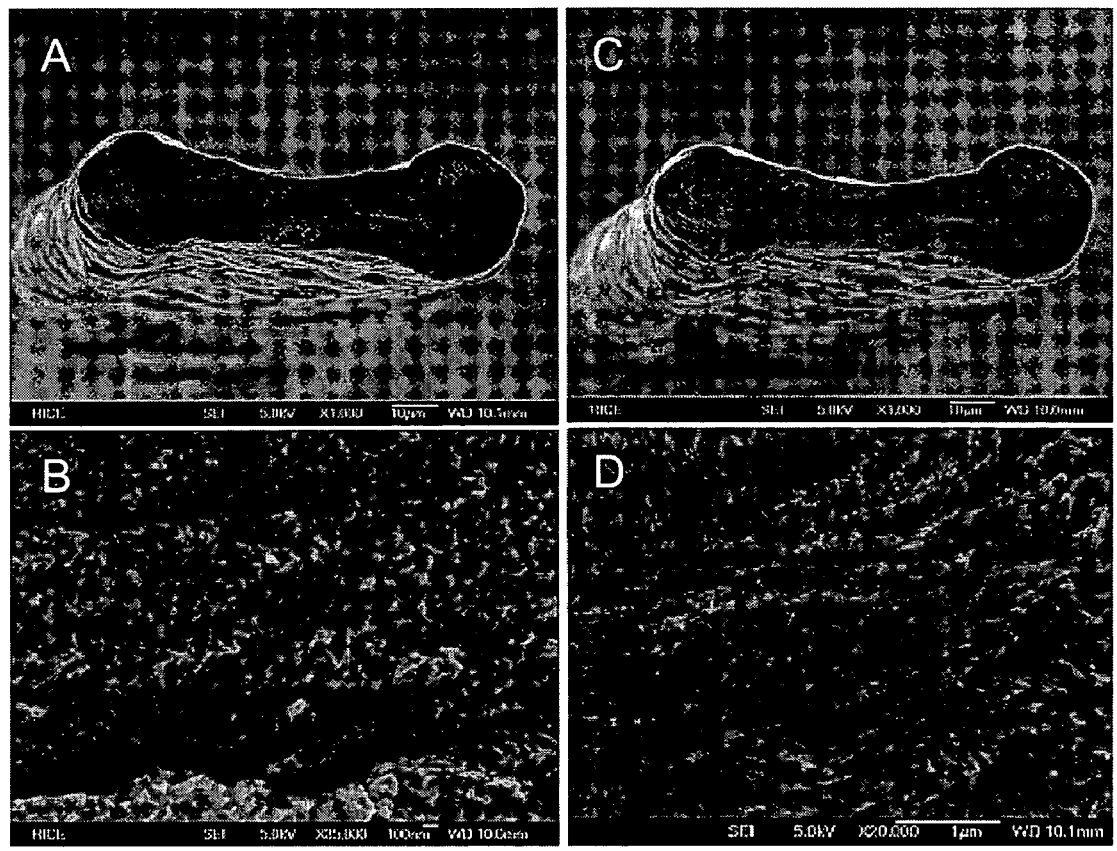
FIGS. 7A-7D illustrates, via SEM, an exemplary preparation of a macroscopic array of open-ended SWNTs. The fiber was spun from a 8 wt % SWNTs/$H_2SO_4$ dispersion with a residual iron content of ca. 0.1 atomic %. (A-B) The combed layer was etched by an inductively coupled oxygen RF plasma with shielding, and cleaned with hydrochloric acid. (C-D) The surface was cleaned by heating in $H_2$ at 735° C. for 30 minutes.

FIGS. 7A-7D illustrates, via SEM, an exemplary preparation of a macroscopic array of open-ended SWNTs, in accordance with some embodiments of the present invention. The fiber was spun from a 8 wt % SWNTs/$H_2SO_4$ dispersion with a residual iron content of ca. 0.1 atomic %. FIGS. 7A and 7B depict a fiber surface after the combed layer was etched by an inductively coupled oxygen RF plasma with shielding, and cleaned with hydrochloric acid. FIGS. 7C and 7D depict the fiber surface after the surface was cleaned by heating in $H_2$ at 735° C. for 30 minutes.

Description of Growth Chamber

Figure 9:
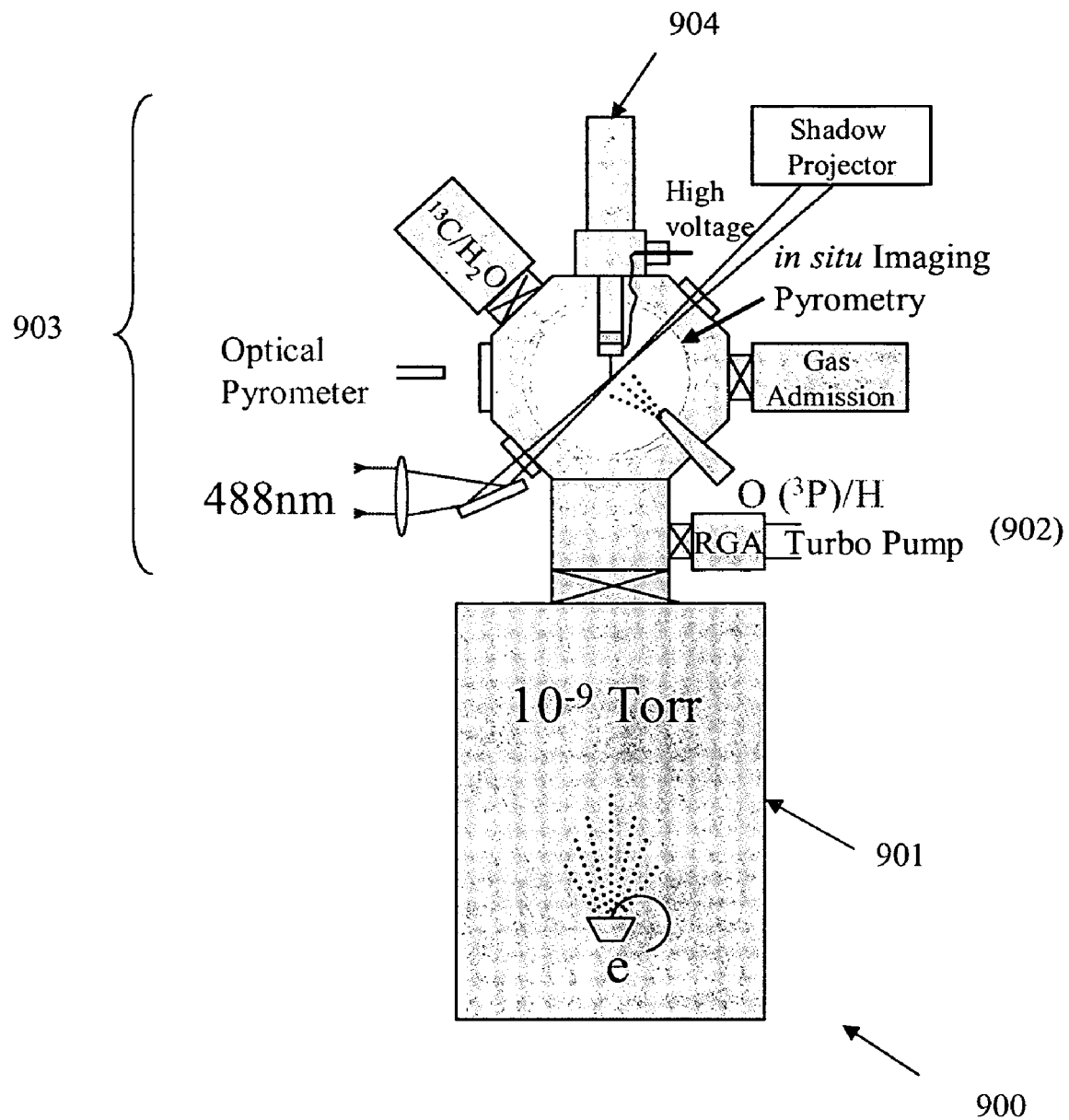
FIG. 9 is a schematic drawing of a continued growth setup, in accordance with some embodiments of the present invention.

Referring to FIG. 9, an exemplary growth chamber 900, operable for use in some embodiments of the present invention, comprises a stainless steel vacuum chamber with numerous ports. There is a larger lower chamber 901 which is pumped by a turbo molecular pump and a mechanical pump (not shown). Lower chamber 901 contains an e-beam metal evaporation source, with the target facing upward. There is an upper chamber 903 connected by a gate valve to the lower chamber. This is fitted with a separate turbo-molecular pump (902) and a mechanical pump (latter not shown). Upper chamber 903 can be valved off from lower chamber 901.

Upper chamber 903 has a vertical translation mount 904 at the top that holds the hypodermic needle and the nanotube fiber. This chamber has a large optical window on either side. One is for viewing the fiber, and the opposite one has a microscope objective that projects an image magnified ca. 50×onto a CCD camera for real-time monitoring. There are optical side ports at a 45° degree angle. The beam from a 488 nm argon ion laser is gently focused and introduced through a window and strikes the bottom of the fiber at a 45° angle. The power of the laser is used to heat the fiber, typically to 800° C. for growth. The blackbody emission from the heated fiber is imaged onto the CCD camera and the intensity of the signal is displayed in the false color image. This in turn provides a mapping of the temperature on the image. A feedback control uses the current regulation circuits in the laser to stabilize the temperature.

When gases are introduced into the upper "optical" chamber 903, the lower chamber 901 is valved off. The main pumpout to the second turbomolecular pump and a mechanical pump is closed off also, and a small solenoid valve controls the outflow of gas to a mechanical pump. A pressure gauge provides feedback to the solenoid valve to maintain the desired pressure.

Hydrogen cleaning gas is introduced from a gas bottle fitted with a pressure regulator and a needle valve. Ethanol growth gas is introduced from vapor from a large 12" diameter dessicator which contains an open beaker of ethanol. When catalyst is added, all input gases are closed off, and the main gate valve to the lower chamber is opened. A small amount of hydrogen is introduced, and the evaporator is turned on. The amount of catalyst deposited is monitored with a quartz microbalance.

Nanotube Fiber Catalyst Deposition

In some embodiments, the plasma etched SWNT fiber (etched cut fiber) is attached to a vertical translator and positioned in the center in the upper chamber, where it will be near the focal point of the 488 nm laser beam (see above). The fiber is heated by the laser to ca. 750° C. The gate valve to the lower chamber is opened and low pressure hydrogen is introduced. Catalyst is evaporated by the e-beam and the thickness is monitored by the quartz microbalance until a thickness of two monolayers, or 0.6 nm, is achieved.

Then the gate valve is closed and hydrogen is introduced into the upper chamber to a pressure of 0.3 Torr. The fiber is heated by the laser to 800° C. for 20 minutes. This helps the catalyst to migrate to the tips of the fibers and will help remove oxygen and other debris. There will be some etching of the nanotubes at the tips where there is catalyst. The temperature is monitored with the CCD camera, and images observed on a computer screen are recorded to a hard drive.

The fiber and its hypodermic needle holder are removed from the chamber and placed into an 1N HCl bath This will dissolve away the catalyst and remove other carbon debris from the tip of the fiber. It is then washed in alcohol. An SEM image of the cleaned tip is made, and will be used for reference to compare to the grown fiber.

The fiber is returned to the growth chamber and repositioned in the center. The gate valve is opened, the fiber is heated with the laser. A monolayer of catalyst is deposited using the method described previously. Then the fiber is subjected to a second treatment in hydrogen and laser heating also described previously. This puts the catalyst at the tips of the nanotubes and causes "reductive docking" whereby the catalyst particle becomes chemically bonded to the end of the nanotube and forms a continuous SWNT fiber precursor.

Figure 8:
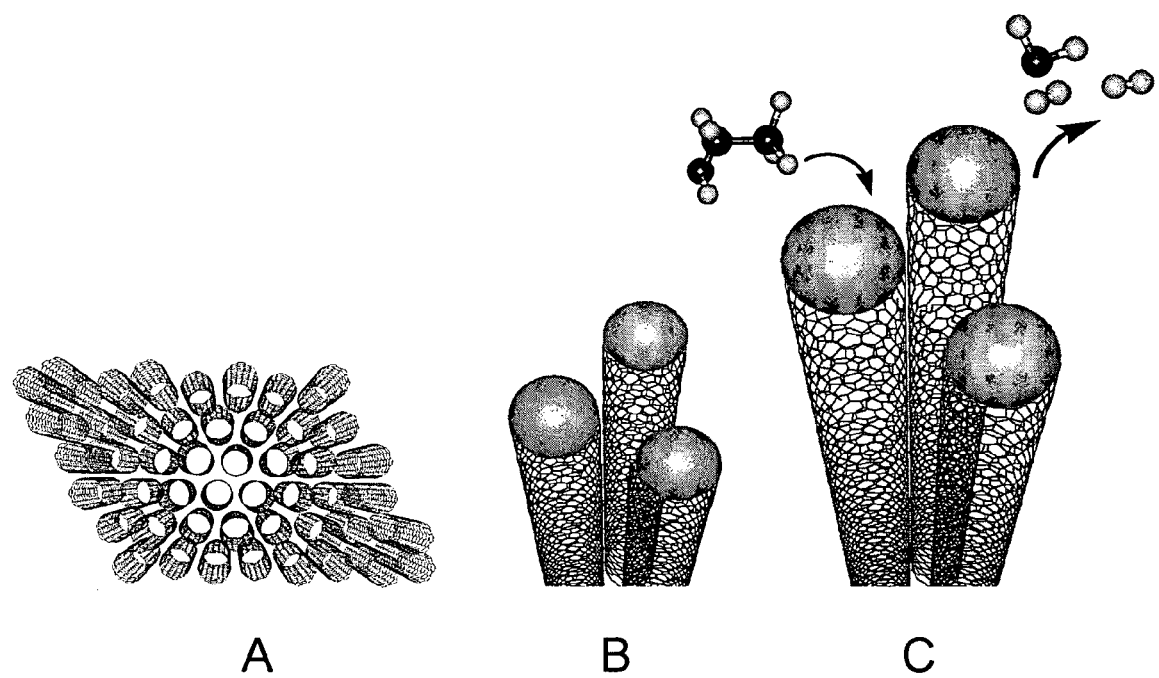
FIG. 8 is a schematic illustration of the three-episode continued growth of SWNTs: (A) preparation of a macroscopic array of open-ended SWNTs, (B) reductive docking of transition metal nanoparticles as catalysts to the nanometer-sized open ends, and (C) activating the docked catalysts and introducing carbon feedstock such as ethanol to grow epitaxially.

To better illustrate the catalyst deposition, FIG. 8 is a schematic illustration of the three-episode continued growth of SWNTs. FIG. 8A depicts the preparation of a macroscopic array of open-ended SWNTs. FIG. 8B depicts the reductive docking of transition metal nanoparticles as catalysts to the nanometer-sized open ends of the SWNTs, and FIG. 8C depicts activating the docked catalysts and introducing carbon feedstock, such as ethanol, to grow epitaxially.

Nanotube Growth

In some embodiments, for continued nanotube growth from the seeded fiber, ethanol is introduced at a pressure of ca. 10 Torr, and a small percentage of hydrogen is added at a partial pressure of ca. 0.1 Torr. The pressure is maintained by a feedback control circuit that regulates a pumpout solenoid valve. The fiber is heated by the laser beam (see above) to ca. 750° C. and monitored by the CCD camera. Temperature is stabilized by controlling the laser current.

The CCD images are displayed on a computer monitor and recorded on a computer hard drive. Growth is observed by an elongation of the CCD camera image. After 1 to 2 hours, the growth gas is turned off, and the fiber is removed.

Characterization

In some embodiments, the fiber, still attached to the hypodermic needle, is put in a SEM for imaging. The tip is imaged at both low and high magnification. The images before and after growth are compared. Newly grown nanotubes tend to stand up and be directional along the fiber axis when they are short (e.g., a few micrometers long). Longer nanotubes, greater than several micrometers in length, tend to become horizontal and turn perpendicular to the fiber axis.

Figure 10:
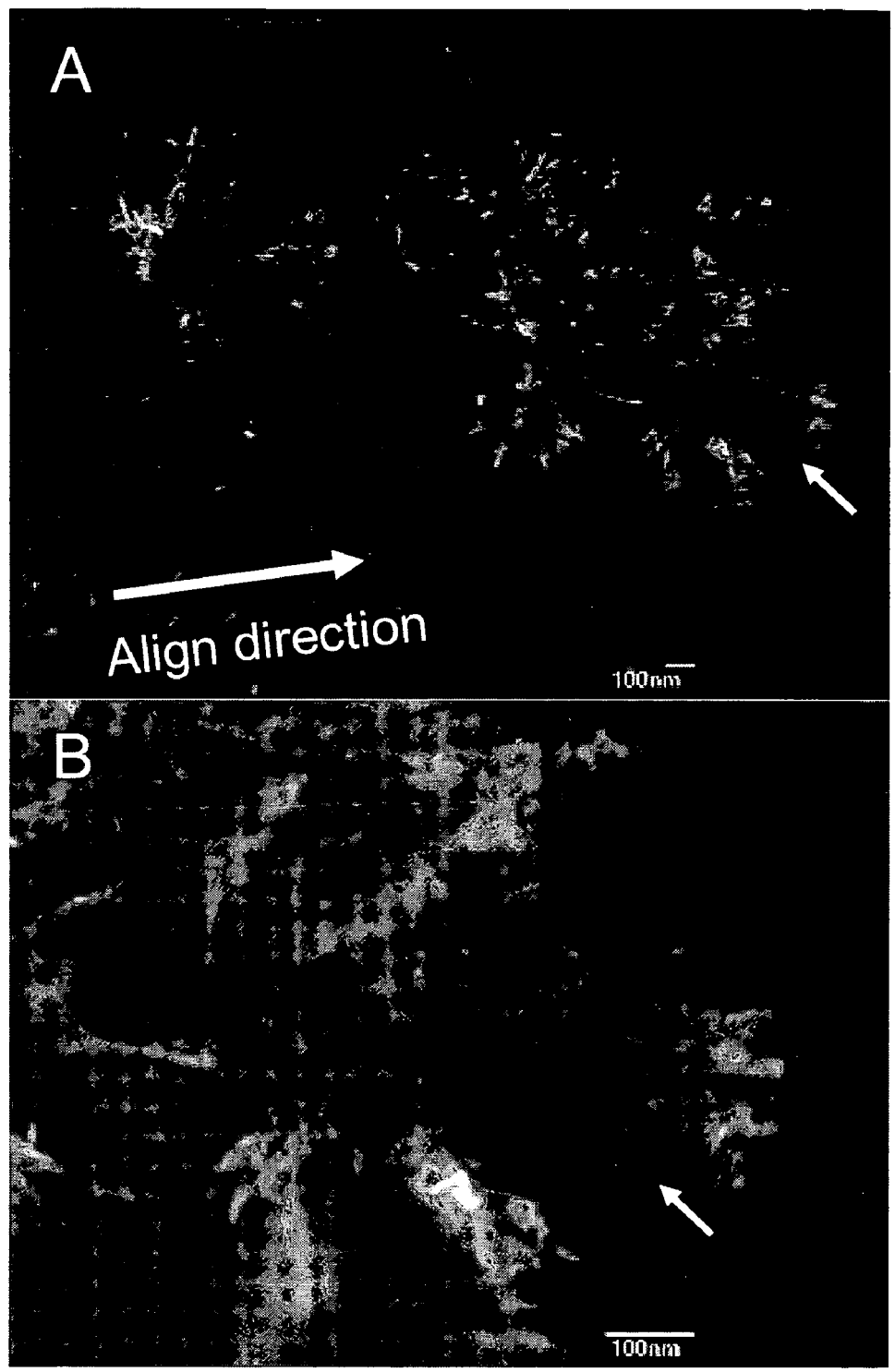
FIGS. 10A and 10B are SEM images depicting growth from the ending edge of a combed layer. The combed layer was first etched with an oxygen plasma for 2 minutes, deposited with 2.5 Å nickel, and then heated up to 800° C. within 2 minutes and kept at 800° C. for 10 minutes in a static pressure of 0.62 Torr $C_2H_4$ and 0.28 Torr $H_2$.

To further illustrate SEM characterization of continuous growth, FIGS. 10A and 10B are SEM images depicting growth from the ending edge of a combed layer. The combed layer was first etched with an oxygen plasma for 2 minutes, deposited with 2.5 Å nickel, and then heated up to 800° C. within 2 minutes and kept at 800° C. for 10 minutes in a static pressure of 0.62 Torr $C_2H_4$ and 0.28 Torr $H_2$.

Figure 11:
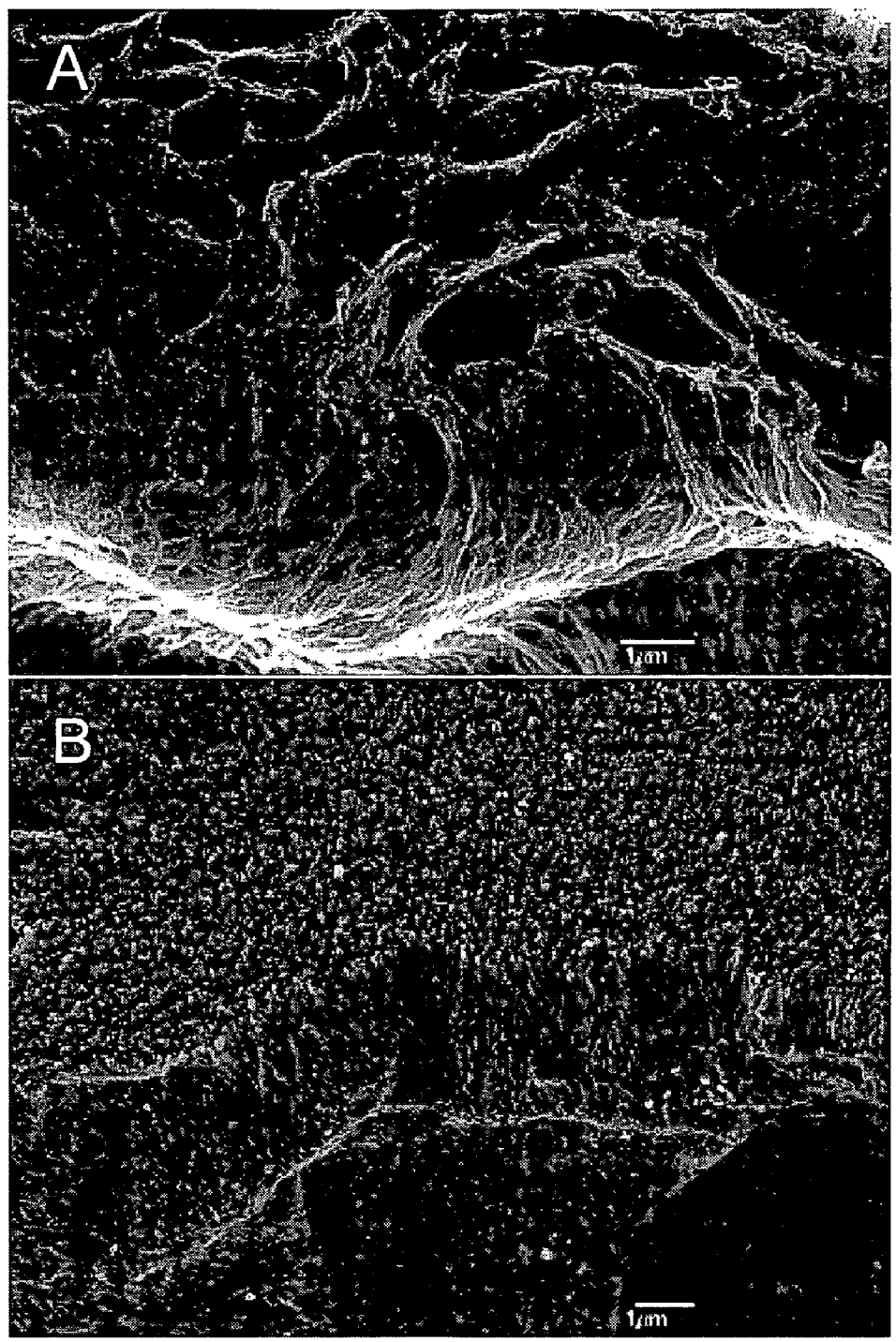
FIGS. 11A and 11B are SEM images depicting a SWNT fiber before (B) and after (A) continued growth with ethylene.

FIGS. 11A and 11B are SEM images depicting a SWNT fiber before (B) and after (A) the continued growth with ethylene. FIG. 11B depicts a SWNT array that was etched with oxygen plasma and cleaned with hydrochloric acid. FIG. 11A depicts approximately the same area shown in (B), but after (1) heating with 0.28 Torr $H_2$ at 840° C. for 30 minutes; (2) deposition of 2.1 Å Fe—Ni and heating in a mixture of $C_2H_4$ (0.47 Torr) and $H_2$ (0.23 Torr) at 820° C. for 60 minutes; and (3) cleaning with hydrochloric acid. Note that the starting fiber has a much higher residual metal content (2.1 atomic %).

Figure 12:
FIGS. 12A and 12B are SEM images depicting continuous ropes (ca. 25 μm) which sprout from an edge of a SWNT substrate after growing with $C_2H_5OH$ (9.9 Torr)+$H_2$(0.02-0.1 Torr) at 800° C. for 80 minutes. The sample was heated to 700° C. within seconds.

FIGS. 12A and 12B are SEM images depicting continuous ropes (ca. 25 μm) which sprout from an edge of a SWNT substrate after growing with $C_2H_5OH$ (9.9 Torr)+$H_2$ (0.02-0.1 Torr) at 800° C. for 80 minutes. The sample was heated to 700° C. within seconds.

Raman spectra of the fiber before and after growth shows the same radial breathing modes (RBM), indicating that the new growth is of the same chirality of nanotubes. Spontaneous nucleation, which would generate new chiralities and new RBM peaks, does not appear to be a significant contributor to the new growth.

The intensities of the RBM peaks varies. The extent of tube-tube interaction is expected to be different in the new fiber, as not all nanotubes nucleate, so the growth is less dense. Also, there may be a different amount of residual catalyst, probably less. The "roping peak" at 267 $cm^{-1}$ is expected to be diminished compared to the lower frequencies of the larger diameter nanotubes, as there is likely to be less tube-tube contact in the new, less dense fiber.

Figure 13:
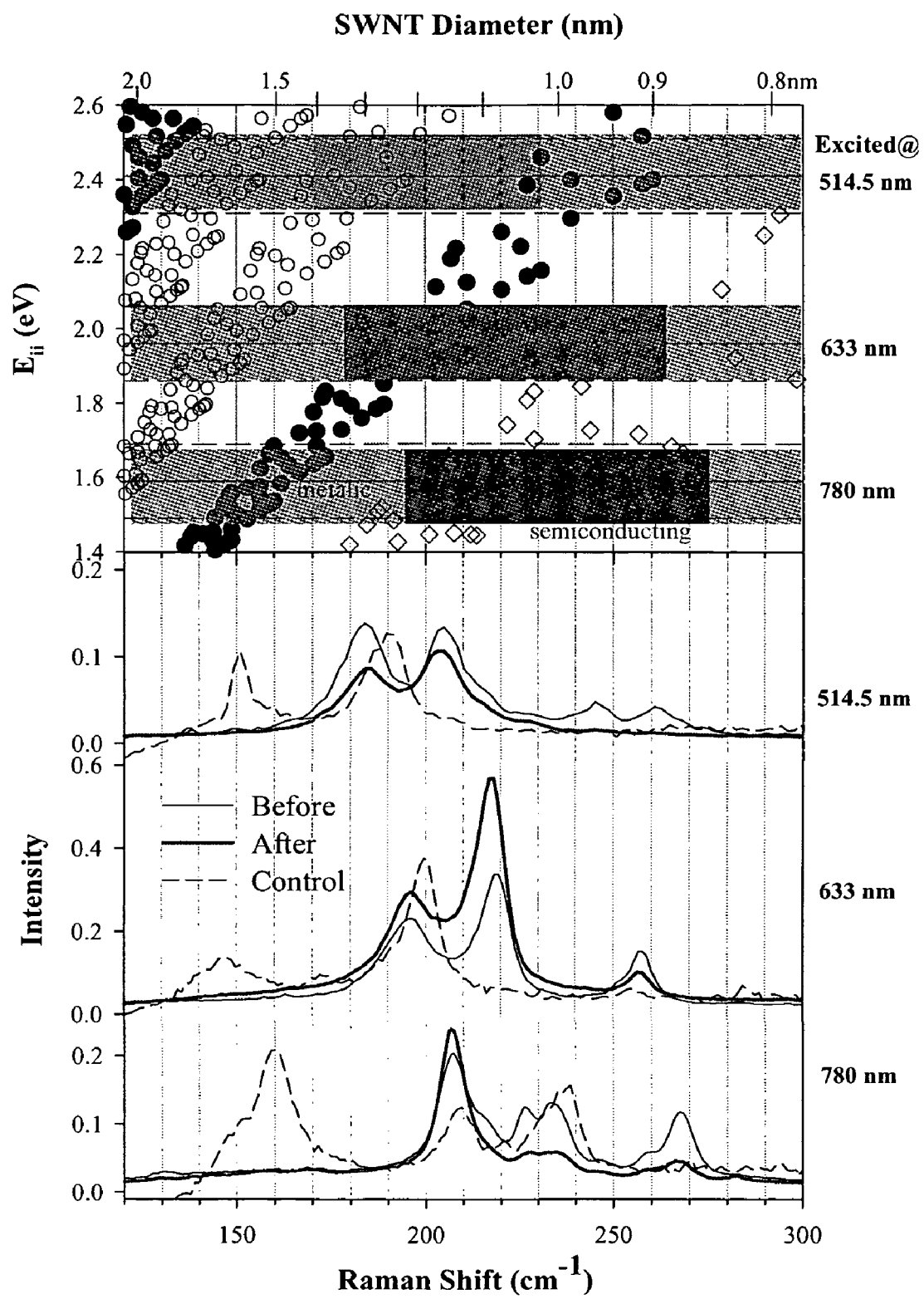
FIG. 13 illustrates a comparison of Raman spectra (radial breathing modes) before and after the continued growth. The intensity was normalized to the G+peak, and the control times two. Notably, RBMs after growth match up with every existing mode from the SWNT seeds. No new radial breathing modes were detected. In comparison, SWNT samples following Maruyama's alcohol CVD recipe (Control) showed many larger diameter tubes that were not detected in the continued growth samples (After). Top: Kataura plot of transition energy as a function of nanotube diameter and Raman shift.

FIG. 13 illustrates a comparison of Raman spectra (radial breathing modes) before and after the continued growth. The intensity was normalized to the G+ peak, and the control times two. Notably, RBMs after growth match up with every existing mode from the SWNT seeds. No new radial breathing modes were detected. In comparison, SWNT samples following Maruyama's alcohol CVD recipe (Control) showed many larger diameter tubes that were not detected in the continued growth samples (After). Top: Kataura plot of transition energy as a function of nanotube diameter and Raman shift. Circles are from Maruyama; diamond from Weisman et al., *Nano Lett.* 2003, 3, 1235. d=223.5/(RBM-12.5) nm for HiPco-produced SWNTs (Carbon Nanotechnologies Inc.).

Compositions and Applications Thereof

A continuously-grown SWNT fiber, produced in accordance with method embodiments of the present invention and comprising individual tubes of continuous length, will have great strength. Such fibers can be used for structural tension members and reinforcement for composites. In the case of pretensioned composites, unlike conventional composites where the filler must be strained to benefit from the reinforcement, pretensioning keeps the composite filler under compression. This can be very beneficial for ceramic composites, as it prevents micro-crack formation. The pretensioned reinforcement is a force-multiplier. The fiber may be used as an electromechanical actuator by applying an electric charge. It also may be used as a strain indicator by monitoring charge-induced strain. The continuous SWNT may then be a component of "smart" materials.

In some embodiments, the continuously-grown SWNT fiber is a directional conductor for heat and/or electricity. For computer chips and electronic devices, unidirectional heat transport to an external heat sink is highly desirable to minimize heating of adjacent circuitry. For reactors and engines, directional transport is also useful.

In some embodiments, the continuously-grown SWNT fiber is a bundled array. Such bundled arrays can be used to reinforce plastics and ceramics, and where they are embedded in the matrix, can provide unidirectional electrical and thermal conductivity. The fiber may be compact, or a loose, low density heat coupler. For reactor applications, the fiber may be embedded in an insulating ceramic, providing unidirectional transfer between heat reservoirs.

In some embodiments, the continuously-grown SWNT fiber is a chirality-selected and cloned SWNT spun fiber. SWNTs mostly or entirely of a single chirality, or generally possessing a single (n,m) value, are incorporated into the continuously-grown fiber bundle. For metallic SWNTs (in particular armchair SWNTs, where n=m), these have exceptionally high electrical and thermal conductivity, for the best possible heat transport. For semiconductor SWNTs, identical fibers will have identical bandgaps and can be used for small and large switching devices. With the narrow band absorption, sheets of these fibers are operable for use as optical filters for photonic device applications.

In some embodiments, the continuously-grown SWNT fiber is a single crystal fiber. SWNTs of a single chirality are arranged in a densely packed regular array within the bundle with a regular lattice spacing. Individual SWNTs traverse the length of the fiber bundle. In addition to the above-mentioned benefits of electrical and thermal transport, thin slices of this crystal provide nanoscale membranes for filtration, wherein pore size can be varied precisely by the SWNT diameter.

In some embodiments, the continuously-grown SWNT fiber is a quantum wire comprising largely metallic SWNTs. A fiber bundle is comprised substantially or entirely of "armchair" SWNTs, whereby the chirality angle is 30° degrees and n=m for the (n,m) designation. The fiber bundle is an excellent conductor, superior to copper. This also will be the best electrical conductor for all applications requiring electrical conduction. This ranges from nanoscale connections of computer chips to electric motors to power cables. This can be particularly useful for electrically-powered military craft such as ships and aircraft where weight and volume are critical. It also may be woven into clothing as conductors for military personnel to interconnect sensors, electronic gear, and weapons, in order to provide an integrated combat suit.

In some embodiments, the continuously-grown SWNT fiber is a quantum wire comprising largely doped semiconducting SWNTs. A fiber bundle is comprised of SWNTs with an intercalated electron donating dopant, such as lithium, or other alkali or alkaline metals. The donated electrons are in the conduction band, causing the semiconductor SWNT fiber bundle to become conducting. This is useful where controlled power dissipation is needed, such as for heating. The resistance is varied with dopant levels.

In some embodiments, the continuously-grown SWNT fiber is operable for use in nanoscale transformers and inductors. Inductors are one of the fundamental elements of electronic circuits, and the most difficult to scale to nanometer dimensions. Coiled SWNTs with or without ferrite provide inductors and transformers on a small scale.

In some embodiments, the continuously-grown SWNT fiber is operable for use in nanoscale magnets and motors. Very high magnetic gradients can be provided with small coils for nuclear magnetic resonance (NMR) imaging. With corresponding nanoscale circuitry, NMR imaging may be done with a small probe or catheter, with very high spatial resolution. Nanoscale motors, with or without ferrite cores, will provide mechanical power for microscale robots.

In some embodiments, the continuously-grown SWNT fiber can be a "bed of nails" film. This can be a high thermal conductivity support for electronic devices. The support may be either electrically insulating or conducting by choice of chirality and doping. Placement of a metal film, or different chirality membrane on top creates an electronic junction for use as a diode, transistor, or integrated circuit. With large thermal conductivity, large area films can be incorporated into a high power rectifier and power transistor. It will also function at very high temperatures.

In some embodiments, the continuously-grown SWNT fiber is operable for use as a nanoscale membrane. If the array is cut on both ends, then this is a membrane which is porous on the nanoscale, depending on the diameter of the SWNTs, and may be suitable for filtration of gases, liquids, air and water purification, and electrochemical membranes, such as are used for batteries.

In some embodiments, the continuously-grown SWNT fiber is a low density array structure. These are infused with organic polymer or ceramic to provide highly directional heat and electrical conduction in an inert support which can tolerate high temperatures. An insulating matrix will provide extremely directional thermal and electrical transport.

In some embodiments, the continuously-grown SWNT fiber is operable for use in nanoscale heaters. In some such embodiments, electrical current is supplied to composite-embedded semiconductor or semimetal SWNTs. Surface electrodes can be used to supply power to the nanoscale heaters.

In some embodiments, the continuously-grown SWNT fiber takes the form of a "pine tree forest," wherein the pointed structure of the plasma-etched fibers are electron emitters forming a sub-micron high density emitter array for electron beam sources and for electron emission based displays that can operate at very low voltages.

In some embodiments, the continuously-grown SWNT fiber, as a result of striated side etching, comprises a layered structure of the plasma-etched fiber sidewalls are electron emitters from a filament-like fiber providing a linear electron emitter or emitter arrays.

In some embodiments, the continuously-grown SWNT fiber comprises diamond or diamond-like carbon (DLC)-tipped nanotubes that provide nanoscale semiconductor junctions. These may be used as nanoscale rectifiers and "nano-antennas" providing rectification of optical radiation into electric power. These could be used for direct conversion of thermal power into electric power in conventional furnaces and nuclear power reactors. In the latter case, power is removed without a physical heat transport fluid that can become contaminated with radioactivity.

To further highlight the novelty of the present invention, epitaxial growth of SWNTs, also known as "continuous growth," is a method whereby a bundle or fiber of aligned single-wall carbon nanotubes is elongated by the addition of catalyst and carbon-containing "growth gas." Unlike conventional supported catalyst growth from a substrate, the growth takes place on the ends of pre-existing SWNTs. The catalyst is deposited onto the tips of the nanotubes, which act as templates for subsequent growth. Since the catalyst is not anchored to a support substrate, it is free to move with the growing fiber and remain at the tip. This mitigates the feedstock starvation problem that restricts growth from a supported catalyst. In this case, the catalyst is at the tip, where it can receive a continuing supply of carbon feedstock gas, and also receive supplemental catalyst. This will allow continuous growth for an indefinite period. The seed fiber is also the template for the growth. Growth conditions may be chosen so that the primary process is extension of existing nanotubes and spontaneous nucleation from catalyst particles is avoided.

In some embodiments, by selection of the chirality of the seed nanotubes and fibers, the chirality of the continuously-grown nanotubes and corresponding fiber may likewise be selected. The properties of the continuously-grown fiber may be determined in advance. It also allows use of chirality presorted seed fibers such that substantially all of the nanotubes are of like chirality and physical properties. The fiber may be cut to make more seeds and thereby amplified as much as needed. Selection of a single chirality seed provides for close packing of nanotubes into a crystalline array. The physical structure, as well as the chirality, of the seed can be retained in the continued growth processes, so that crystals of carbon nanotubes can be continuously grown to endless lengths. This in turn yields wires, cables, heat conductors, fibers for composites, bed-of-nails membranes, and electronic nanotube components of specifiable properties.

While the discussion herein primarily involves SWNTs, those of skill in the art will appreciate that the methods of the present invention can be extended to generally include other carbon nanotubes (CNTs), such that the CNTs can be spun into a fiber and further grown with a feedstock gas under growth conditions. Other such suitable CNTs include, but are not limited to, multi-wall carbon nanotubes (MWNTs), double-wall carbon nanotubes, small diameter (<3 nm) carbon nanotubes, and combinations thereof.

The following examples provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention. The exemplary embodiments described in the examples which follow are more fully detailed in Wang et al., *Nano Lett.*, 2005, 5, 997-1002.

EXAMPLE 1

This example provides an overview of SWNT continued growth, in accordance with some embodiments of the present invention, and as detailed in subsequent examples.

In the examples which follow, the continued growth of seeded SWNTs is demonstrated in a way analogous to epitaxy. By starting with a seeded SWNT, Applicants' approach bypasses the nanotube nucleation step. Instead, SWNTs restart the growth as an extension of the existing SWNTs and therefore inherit the same diameter and chirality from the starting SWNTs (seeds). The ability to separate the typically inefficient nucleation step from the growth of SWNTs, and to restart the growth, coupled with the continuing advances toward type-specific chemistry/separation of SWNTs [Chen et al., *Nano Lett.* 2003, 3, 1245; Zheng et al., *Nature Materials* 2003, 2, 338; Krupke et al., *Science* 2003, 301, 344; Strano et al., *Science* 2003, 301, 1519; Chattopadhyay et al., *J. Am. Chem. Soc.* 2003, 125, 3370], opens the possibility of amplifying SWNTs with only the desired (n, m)s.

FIG. 8 illustrates three stages involved in continuous growth: (A) preparing an ordered array of open-ended SWNTs; (B) reductively docking transition metals as a catalyst to the nanometer-sized open ends; and then (C) heating to 700-850° C. in the presence of a carbon feedstock such as ethanol or ethylene. To prepare an ordered array of open-ended SWNTs, Applicants spun SWNTs of finite length into a continuous, aligned, neat fiber [Ericson et al., *Science* 2004, 305, 1447], microtomed the fiber to obtain a flat surface, etched SWNTs homogeneously, without differentiating the sidewalls and the ends, and then removed surface contaminants on SWNTs while keeping the ends open. This produces a clean—largely free of amorphous carbon, oxides, and metal residues —SWNT substrate with open-ended SWNTs aligned along the fiber axis.

EXAMPLE 2

This example serves to illustrate preparation of SWNT fibers, in accordance with some embodiments of the present invention.

Neat SWNT fibers, containing no surfactant or polymer, were made by spinning a 8 wt % dispersion of purified HiPco-produced SWNT material in 102% sulfuric acid (with 2 wt % excess $SO_3$) into an ether coagulant [Ericson et al., *Science* 2004, 305, 1447]. A 60 cm length of fiber, hanging in space with only the two ends glued to a quartz boat, was annealed stepwise at 110° C., 350° C., 900° C., and then cooled down to 800° C. and room temperature, holding at each temperature for 3 hours in a flow of 20 sccm $H_2$ and 740 sccm Ar (both 99.999% purity). The annealing completely removed residual sulfuric acid and improved the mechanical strength of the fiber. Further rinsing with hydrochloric acid reduced the residual metals, which migrated to the surface, to a trace level (<0.2 at. %), as determined by energy dispersive X-ray analysis. The fiber possessed a polarization Raman ratio of about 20:1, suggesting excellent alignment of SWNTs along the fiber axis [Ericson et al., *Science* 2004, 305, 1447].

EXAMPLE 3

This example serves to illustrate microtome cutting, in accordance with some embodiments of the present invention.

Figure 14:
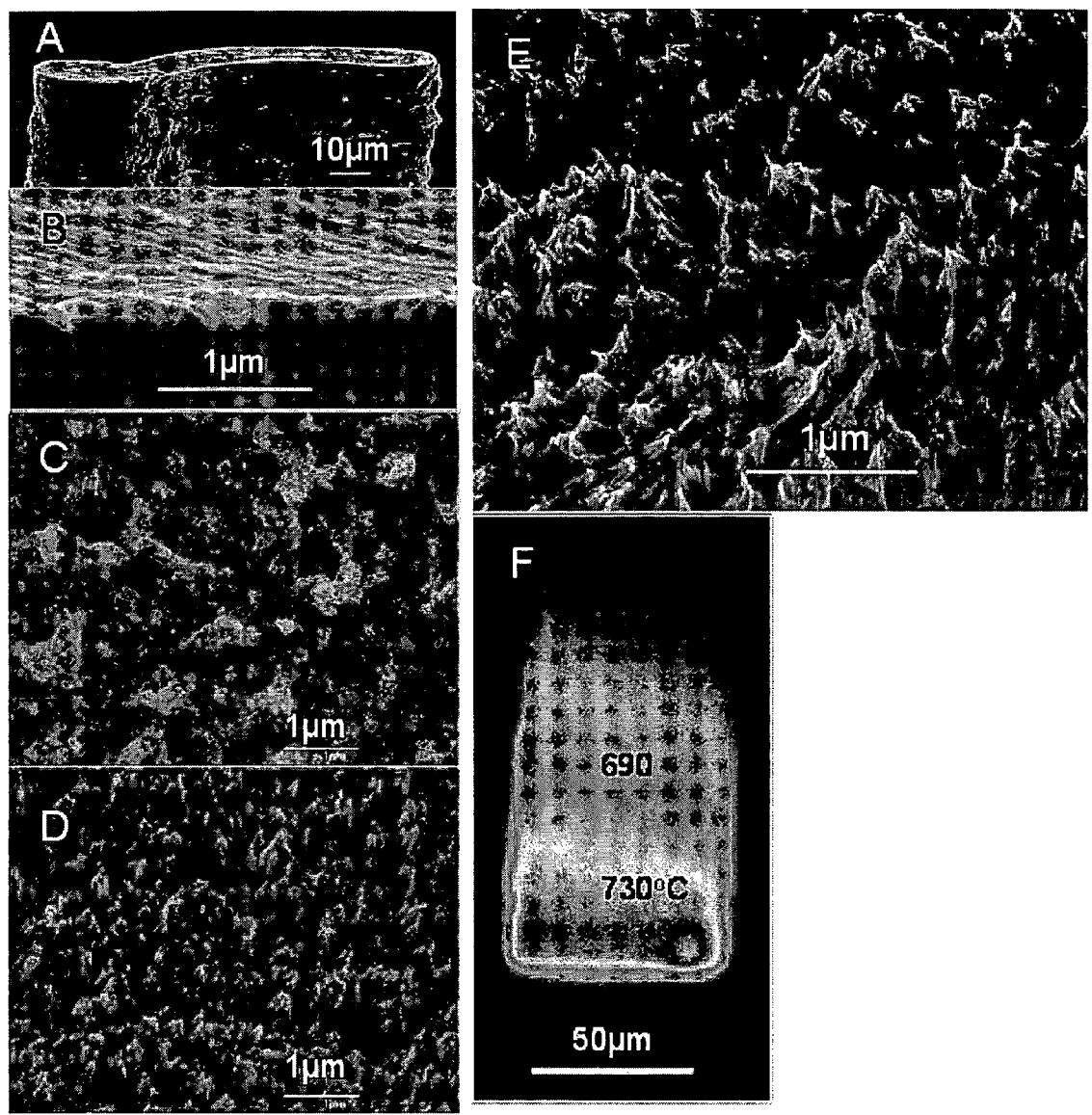
FIGS. 14A-F depict the preparation of an ordered array of open-ended SWNTs. (A) A flat surface created by microtoming substantially perpendicular to the fiber axis of a SWNT neat fiber. (B) The edge of the microtomed surface showing nanotubes combed along the cutting direction. The combed layer was etched with atomic oxygen (C), and removed with hydrochloric acid to give a macroscopic surface of open-ended SWNTs (D). The surface was further cleaned by heating with 0.32 torr $H_2$ at ~730° C. for 30 minutes. A thin layer (4.2 Å) Fe—Ni (50-50 wt %) was deposited on the surface to facilitate the removing of carbon oxides. The exposed metals were removed with acid to give a clean substrate with open-ended SWNTs aligned along the normal to the substrate (E).

To achieve a flat surface, a ca. 10 mm length of SWNT neat fiber was embedded in a 2.3M sucrose solution, frozen to −100° C., and microtomed perpendicular to the fiber axis with a diamond knife (DiATOME) [Wang, Y. H. Seed Crystals and Catalyzed Epitaxy of Single-Walled Carbon Nanotubes. Thesis, Rice University, 2004]. After microtoming, the remaining fiber was recovered intact, rinsed with de-ionized water to remove sucrose, and then mounted onto a stainless steel hypodermic needle, with the microtomed end protruding 2-3 mm for subsequent processing. Conductive silver paint was used to secure the fiber and to ensure good electric contact. The diamond knife did not apparently "cut" the tubes, but instead combed the fibrils along the cutting direction, producing a layer only 20-50 nm thick with almost perfect alignment (FIG. 14B). Given the unrivaled hardness and the extreme sharpness (radius of curvature<2 nm) of the diamond knife, this combing effect constitutes a direct visualization of the exceptional toughness and stiffness of SWNTs, similar to previous observation with a multiwall carbon nanotubes/epoxy composite [Ajayan et al., *Science* 1994, 265, 1212].

EXAMPLE 4

This example serves to illustrate plasma etching of the cut SWNT fiber so as to yield an etched cut fiber, in accordance with some embodiments of the present invention.

The combed layer was etched with atomic oxygen (O) generated by UV photon-dissociation of ozone ($O_3$) or by inductive-coupled plasma [Wang, Y. H. Seed Crystals and Catalyzed Epitaxy of Single-Walled Carbon Nanotubes. Thesis, Rice University, 2004]. The resulting debris and exposed residual metal were subsequently removed with 1N hydrochloric acid (FIG. 14D). In contrast with $O_2$ and $H_2$, atomic oxygen etched SWNTs at near unity efficiency with almost no differentiation of sidewalls and ends, thereby leaving oxidized sidewalls, if exposed, and presumably open ends terminated with oxygen-containing functional groups such as carboxylic acid and quinone. To remove the sidewall oxides, Applicants deposited a thin layer (4.2 Å) of Fe—Ni (50-50 wt %) alloy onto the surface as a $H_2$ dissociation catalyst and subsequently heated the surface to 730° C. in 0.32 torr $H_2$ for 30 minutes. While $H_2$ alone was capable of removing these surface oxides, the deposited metal catalyst lowered the effective reaction temperature by ca. 100° C. This placed the open ends at a temperature lower than 800° C., where open-ended SWNTs remain open—as evidenced by a Xe absorption capacity 280 times that of a close-ended SWNT sample [Kuznetsova et al., *Chem. Phys. Lett.* 2000, 321, 292; Byl et al., *J. Am. Chem. Soc.* 2003, 125, 5889]. The exposed residual metals were removed with hydrochloric acid to give a clean SWNT array with open ends readily exposed for the reductive docking (FIG. 14E).

EXAMPLE 5

This example serves to illustrate metal deposition onto the etched cut SWNT fiber so as to form a continuous SWNT fiber precursor, in accordance with some embodiments of the present invention.

To dock a metal nanoparticle onto the open end of a SWNT, Applicants took advantage of the structural difference between the sidewall and the open end of a SWNT. The sidewall, like the graphite basal plane, is chemically inert to most metals [Zhang et al., *Chem. Phys. Lett.* 2000, 331, 35]. A vapor deposited metal atom (Fe or Ni) diffuses at room temperature until it encounters an open end (if no other surface defects exist) to which it can bond strongly (ca. 2-3 eV) and form a nucleation center. Subsequent atoms bond to these nucleation centers and grow into clusters sufficiently large to serve as a catalyst for continued growth of the SWNTs. Typically, a thin layer (2.1 Å) of Fe—Ni 50-50 wt % alloy was e-beam-evaporated onto the SWNT substrate. During the deposition, the substrate was kept at 300-350° C. in $5 \times 10^{-6}$ Torr $H_2$ to allow the metal atoms to diffuse. After deposition, most metal particles were observed accumulating at the SWNT ends and step-edges along ropes, with a size equal to or less than the scanning electron microscopy (SEM) resolution limit of ca. 3 nm. The metal particle attached to the SWNT end digests the SWNT along its length, during which it may adapt itself to the structure of the open end in a process Applicants term "reductive docking."

EXAMPLE 6

This example serves to illustrate continuous growth of a continuous SWNT fiber precursor by introducing feedstock gases under SWNT growth conditions to grow the continuous SWNT fiber precursor into a continuous SWNT fiber, in accordance with some embodiments of the present invention.

After the reductive docking described in EXAMPLE 5, continued growth was started by a smooth transition from a $H_2$/Ar environment to a growth environment while keeping the SWNTs at the growth temperatures, or alternatively, by a rapid heating to the desired growth temperature in just 0.5-3 minutes—immediately following the introduction of carbon feedstock. Both of these strategies were aimed to activate the SWNT/catalyst integrity, so as to mimic a growing SWNT in the HiPco process [Bronikowski et al., *J. Vac. Sci. & Technol. A: Vacuum, Surfaces, and Films* 2001, 19, 1800].

EXAMPLE 7

This example serves to illustrate scanning electron microscopy (SEM) characterization of continuous SWNT fibers produced in accordance with some embodiments of the present invention.

FIGS. 12A and 12B are SEM images of an edge of a macroscopic array of open-ended SWNTs after growth using $C_2H_5OH$ as feedstock. The morphology of the surface changed significantly after growth, which was not observed for samples heated solely in $H_2$. FIG. 12B shows loose SWNT ropes sprouting from an edge of a macroscopic array of SWNTs and undulate along the substrate for over 25 μm before an apparent end could be found. The sample shows a rougher surface than before growth, with ropes sticking out from the microtomed surface up to 1.7 μm in length. In every case, the nanotube ropes were found rooted to the existing nanotubes and tended to maintain the orientation of their seeds, although different ropes often grew along different directions. Applicants suspect that these ropes originally grew along the fiber axis, but fell over onto the plane of the substrate midway through their growth. This explanation is supported by the observation of rapid extension of the incandescence (viewed by the CCD camera) in various regions during the first 5-20 minutes of growth, while the overall extension of the incandescence was much slower. The termination of growth was likely caused by two mechanisms. As a nanotube falls over onto the substrate, its growth path can be blocked easily by other tubes and particles. As the nanotube grows away from the substrate, it is cooled down by the increasing collisions with the cold feed gases that can not be heated directly by the $Ar^+$ laser beam. Both mechanisms could terminate the growth. Applicants believe, however, that the growth should never stop if the growing SWNTs are packed in an array such that each tube is in side-by-side van der Waals contact with six others and the "live" end of the tube is always exposed and free to grow.

EXAMPLE 8

This example illustrates Raman spectroscopic analyses on the SWNT fibers before and after being subjected to methods of continued growth.

To prove that these new fibers are continued growth of the existing SWNTs, Applicants characterized the new fibers, as opposed to the starting SWNT arrays, with a Raman microscope (Renishaw Micro-Raman System 1000). Three laser excitation lines (514.5, 633, and 780 nm) were used to cover a broad range of (n, m), each of which is shown as a point in the Kataura plot [Kataura et al., *Synthetic Metals* 1999, 103, 2555]. All Raman spectra were obtained using an 1800 grooves/mm grating, with a corresponding spectral resolution better than 0.7, 1.2, and 1.8 cm$^{-1}$ for 780, 633, and 514.5 nm, respectively. To enhance the Raman signal from the restarted growth, Applicants took advantage of the anisotropic polarization of SWNTs [Duesberg et al., *Phys. Rev. Lett.* 2000, 85, 5436] by aligning the polarization of the incident laser light parallel to the new fibers. These fibers showed a parallel-to-perpendicular Raman ratio of ca. 3:1, whereas the underlying starting SWNT arrays, which were perpendicular to the new fibers, gave a ratio typically between 1.1:1 and 1.3:1, slightly deviating from the expected 1:1 because of small tilt angles between the incident light and the fiber axis. The difference between the two ratios, amounting to over 56% Raman signal, was therefore attributed to the new growth.

None of the Raman spectra reveal any multiwall carbon nanotubes (MWNTs). The addition of MWNTs would result in a decrease in the $G^+/G^-$ ratio and an increase in the frequency of the Raman shift of the $G^+$ peak if there were as few as 7.6% MWNTs [Qian et al., *Carbon* 2003, 41, 1851], neither of which is observed in the sample after continued growth. While Raman spectra are not sensitive enough to preclude any growth of MWNTs in the experiments described in the examples herein, it is safe to estimate that at least 92% of the Raman signal arises from SWNTs. From the above two estimates, Applicants infer that more than 50% of the Raman signal arises from new SWNTs.

FIG. 13 compares the radial breathing modes (RBMs) of Raman spectra before and after growth. Over 150 different (n, m), each shown as a point in the Kataura plot [Kataura et al., *Synthetic Metals* 1999, 103, 2555] (FIG. 13, top panel), are covered by the three excitation windows. Strikingly, the positions of RBMs after growth closely match up with almost every existing mode from the seeded SWNTs. As the Kataura plot shows, approximately four times more species are within the windows of detection for resonance enhancement of the RBMs than were actually observed. Yet, subsequent to the continued growth process, there is not a single instance of any additional chirality appearing in the RBM spectra for any of the three lasers. Thus, even though catalyst nanoparticles with a wide range of diameters are present, the variety of (larger) diameter SWNTs expected from dominant nucleated growth was not detected. In comparison, SWNT samples prepared following the alcohol CVD recipe of Murakami [Murakami et al., *Chem. Phys. Lett.* 2003, 377, 49], whose conditions (growth temperature and feedstock) were closely followed in these continued growth experiments, show the presence of a large portion of SWNTs with relatively larger diameters. Therefore, Applicants rule out spontaneous nucleation as a significant contribution to the new growth. Further analysis of the Raman spectra shows that SWNTs with larger diameters are more populated after growth. Applicants attribute this shift to preferential growth of larger diameter SWNTs and/or selective removal of smaller diameter SWNTs during the reductive docking process. From each sample, 4-7 spots (spot size ca. 1 $\mu m^2$) were taken for comparison. The RBMs appeared at the same wavenumbers, but the relative intensities varied, suggesting an inhomogeneous growth across the SWNT array. The growth was less dense since not all nanotubes restart growth and therefore the "roping peak" at 267 $cm^{-1}$ was diminished due to less tube-tube contact [Heller et al., *J. Phys. Chem. B* 2004, 108, 6905].

These Raman results—both the close matching of the new growth's RBMs with the seeded SWNTs' and the absence of otherwise inevitable spontaneous nucleation—cannot be explained without invoking the continued growth mechanism. While not intending to be bound by theory, Applicants believe that tip growth is the active mechanism during the SWNT continued growth process. After growth, metal particles are frequently observed at the ends of nanotubes (SEM, result not shown), but further work is needed to determine unambiguously the size and chemical state of the catalyst. Applicants argue that, with the tip growth mechanism, the growing tips stay exposed, thereby eliminating the diffusion problem that generally occurs when the catalyst is at the base of the nanotube [Louchev et al., *Appl. Phys. Lett.* 2002, 80, 2752]. The ability to restart the growth of SWNTs, coupled with the ease of precursor diffusion, opens the opportunity to grow nanotubes, in principle, to unlimited lengths, simply by repeating the process.

EXAMPLE 9

This example summarizes the results of EXAMPLES 1-8 and draws conclusions from these examples.

While the continued growth experiments described in the examples above were successful under varying carbon precursors and temperatures, the process was sensitive to SWNT surface conditions and extraneous environmental species. Growth was severely retarded in sample areas that had been extensively imaged by a SEM before growth. This effect is attributed to compromised SWNT ends, either because of structure damage from the electron beam and/or unavoidable amorphous carbon surface contamination during SEM. Similarly, annealing the open-ended SWNTs at 1140° C. in a vacuum better than $6 \times 10^{-8}$ Torr for 30 min closed the open ends, which resulted in little growth. The growth with ethanol was extremely sensitive to trace amount of water and oxygen. A minute amount of water (ca. 1%, determined with an online residual gas analyzer) was enough to completely inhibit the growth and even to cause etching of the SWNT substrates.

Given the relatively low surface density of the starting SWNT fiber seed, estimated to be in the range of $10^{12}$-$3 \times 10^{13}/cm^2$, the observation of growing loose ropes in local regions—a phenomenon only possible when a large number of tubes are growing in about the same direction—is encouraging. It suggests a relatively high overall efficiency in the end opening, reductive docking, and catalyst reactivation steps. Further improvement of these processes, in particular the density of the starting arrays of open-ended SWNTs, may allow the synthesis of a continuous crystalline fiber comprising long, parallel nanotubes in an ordered array. Applicants are optimistic that this pathway can lead to SWNT single crystals of any desired (n, m)—a long sought dream for this field [Thess et al., *Science* 1996, 273, 483; Chisholm et al. *Science* 2003, 300, 1236]. Regardless, a pathway that enables control over both the SWNT diameter and chiral angle during synthesis is now possible.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
    a) providing a spun SWNT fiber;
    b) cuffing the spun SWNT fiber substantially perpendicular to the fiber axis to yield a cut fiber;
    c) etching the cut fiber at its end with an inductively coupled RF plasma to yield an etched cut fiber;
    d) depositing a first metal catalyst on the end of the etched cut fiber;
    e) further etching the etched cut fiber by heating in an atmosphere comprising $H_2$ to form a further etched cut fiber;
       wherein the further etching step comprises removing surface oxides from the SWNTs;

f) removing the first metal catalyst from the further etched cut fiber;
   wherein the removing step comprises placing the further etched cut fiber in an acid bath after the further etching step;
g) depositing a second metal catalyst on the end of the further etched cut fiber after the removing step to form a continuous SWNT fiber precursor; and
h) introducing feedstock gases to the continuous SWNT fiber precursor under SWNT growth conditions to grow the continuous SWNT fiber precursor into a continuous SWNT fiber.

2. The method of claim 1, wherein the spun SWNT fiber is spun from a superacid suspension of SWNTs.

3. The method of claim 1, wherein the spun SWNT fiber is spun from an oleum suspension of SWNTs.

4. The method of claim 1, wherein the cutting step comprises the steps of:
a) mounting the spun SWNT fiber in a matrix material to form an immobilized fiber;
b) using a cutting means to cut the immobilized fiber and matrix material;
   wherein the cut is substantially perpendicular to the fiber axis of the immobilized fiber; and
c) dissolving away the matrix material to yield a cut fiber.

5. The method of claim 4, wherein the matrix material is a polysaccharide.

6. The method of claim 4, wherein the cutting means is a microtome.

7. The method of claim 1, wherein the cutting step comprises the use of a focused ion beam.

8. The method of claim 1, wherein the inductively coupled RF plasma comprises a gas selected from the group consisting of oxygen, argon, and combinations thereof.

9. The method of claim 1, wherein the etching step removes any SWNT portions in the cut fiber that were bent as a result of the cutting step.

10. The method of claim 1, wherein the first metal catalyst and the second metal catalyst are deposited via e-beam metal evaporation.

11. The method of claim 1, wherein the first metal catalyst and the second metal catalyst comprises a metal selected from the group consisting of Fe, Ni, and combinations thereof.

12. The method of claim 1, wherein the SWNT growth conditions comprise heating the continuous SWNT fiber precursor with a laser.

13. The method of claim 1, wherein the feedstock gases comprises at least one carbon-containing species and at least one gas selected from the group consisting of hydrogen, water, and combinations thereof.

14. The method of claim 1, further comprising a step of monitoring growth of the continuous SWNT fiber in situ.

15. The method of claim 14, wherein the in situ monitoring is accomplished with a CCD camera.

16. A method comprising the steps of:
a) providing a CNT fiber;
b) cutting the CNT fiber substantially perpendicular to the fiber axis to yield a cut fiber;
c) etching the cut fiber at its end with an inductively coupled RF plasma to yield an etched cut fiber;
d) depositing a first metal catalyst on the end of the etched cut fiber;
e) further etching the etched cut fiber by heating in an atmosphere comprising $H_2$ to form a further etched cut fiber;
   wherein the further etching step comprises removing surface oxides from the CNTs;
f) removing the first metal catalyst from the further etched cut fiber;
   wherein the removing step comprises placing the further etched cut fiber in an acid bath after the further etching step;
g) depositing a second metal catalyst on the end of the further etched cut fiber after the removing step to form a continuous CNT fiber precursor; and
h) introducing feedstock gases to the continuous CNT fiber precursor under CNT growth conditions to grow the continuous CNT fiber precursor into a continuous CNT fiber.

17. The method of claim 16, wherein the CNT fiber is spun from a superacid suspension of CNTs.

18. The method of claim 16, wherein the cutting step comprises the steps of:
a) mounting the CNT fiber in a matrix material to form an immobilized fiber;
b) using a cutting means to cut the immobilized fiber and matrix material;
   wherein the cut substantially perpendicular to the fiber axis of the immobilized fiber; and
c) dissolving away the matrix material to yield a cut fiber.

19. The method of claim 18, wherein the cutting means is a microtome.

20. The method of claim 16, wherein the inductively coupled RF plasma comprises a gas selected from the group consisting of oxygen, argon, and combinations thereof; and wherein the etching step removes any CNT portions in the cut fiber that were bent as a result of the cutting step.

21. The method of claim 16, wherein the first metal catalyst and the second metal catalyst are deposited via e-beam metal evaporation.

22. The method of claim 16, wherein the first metal catalyst and the second metal catalyst comprises a metal selected from the group consisting of Fe, Ni, and combinations thereof.

23. The method of claim 16, wherein the CNT growth conditions comprise heating the continuous CNT fiber precursor with a laser.

24. The method of claim 16, wherein the feedstock gases comprise at least one carbon-containing species and at least one gas selected from the group consisting of hydrogen, water, and combinations thereof.

25. The method of claim 16, further comprising a step of monitoring growth of the continuous CNT fiber in situ.

26. The method of claim 25, wherein the in situ monitoring is accomplished with a CCD camera.

27. The method of claim 16, wherein the CNTs comprise small diameter carbon nanotubes.

* * * * *